United States Patent [19]
Sugimura et al.

[11] Patent Number: 5,840,808
[45] Date of Patent: Nov. 24, 1998

[54] PROCESS FOR PREPARING OLEFIN POLYMER

[75] Inventors: Kenji Sugimura; Mamoru Kioka, both of Kuga-gun, Japan

[73] Assignee: Mitsui Petrochemical Industries, Ltd., Tokyo, Japan

[21] Appl. No.: 718,385

[22] PCT Filed: Feb. 7, 1996

[86] PCT No.: PCT/JP96/00261

§ 371 Date: Oct. 7, 1996

§ 102(e) Date: Oct. 7, 1996

[87] PCT Pub. No.: WO96/24627

PCT Pub. Date: Aug. 15, 1996

[30] Foreign Application Priority Data

| Feb. 7, 1995 | [JP] | Japan | 7-019512 |
| Feb. 7, 1995 | [JP] | Japan | 7-019514 |
| Feb. 7, 1995 | [JP] | Japan | 7-019515 |

[51] Int. Cl.$^6$ ............................................. C08F 210/16
[52] U.S. Cl. .................. 525/268; 525/270; 526/114; 526/119; 526/943
[58] Field of Search .................. 525/247, 268, 525/270, 240

[56] References Cited

U.S. PATENT DOCUMENTS

| 5,322,902 | 6/1994 | Schreck et al. | 525/268 |
| 5,589,549 | 12/1996 | Govoni et al. | 525/247 |
| 5,605,969 | 2/1997 | Tsutsui et al. | 525/247 |

*Primary Examiner*—Edward J. Smith
*Attorney, Agent, or Firm*—Birch, Stewart, Kolasch & Birch, LLP

[57] ABSTRACT

The present invention provides processes for preparing olefin polymers, by which olefin polymers composed of a propylene block copolymer component and an ethylene/α-olefin copolymer component are directly prepared by polymerization and olefin polymers excellent in impact resistance as well as in mechanical strength such as rigidity, moldability and heat resistance can be prepared. In the processes of the invention, a step (i) for preparing a crystalline polypropylene component and a step (ii) for preparing a low-crystalline or non-crystalline ethylene/α-olefin copolymer component are carried out in an arbitrary order using an olefin polymerization catalyst to form a propylene block copolymer component; then another catalyst component is added to the polymerization system; and a step (iii) for preparing a low-crystalline or non-crystalline ethylene/α-olefin copolymer component is carried out. The components of the olefin polymerization catalyst used for preparing the propylene block copolymer component and the components of another catalyst used for preparing the ethylene/α-olefin copolymer component (iii) are selected from (A) a solid titanium catalyst component, (B) an organometallic compound, (C) an electron donor, (D) a specific transition metal compound containing a ligand having cyclopentadienyl skeleton, (E-1) an organoaluminum oxy-compound and (E-2) Lewis acid or ionic compound.

4 Claims, 4 Drawing Sheets

FIG.3

```
                                              ┌─────────────┐
                                              │(iii)Ethylene/│
                                              │ α-olefin co-│
                                              │ polymeriza- │
                                              │ tion step   │
                                              └─────────────┘
                                                    ▲
                                                    │
                              ┌─────────────┐       │
                              │(ii)Ethylene/│       │
                              │ α-olefin co-│       │
                              │ polymeriza- │       │
                              │ tion step   │       │
                              └─────────────┘       │
                                    ▲               │
                                    │               │
              ┌─────────────┐       │               │
              │(i)Propylene │       │               │
              │polymerization│      │               │
              │ step        │       │               │
              └─────────────┘       │               │
                    ▲               │               │
                    │               │               │
```

[I] Transition metal catalyst component

[I-2] Solid transition metal catalyst component comprising
  (D-1) Solid catalyst component comprising transition metal compound containing ligand having cyclopentadienyl skeleton, and supported thereon
  (A-1) Titanium catalyst component

[II] Organometallic catalyst component
  (B) Organometallic compound

[III] Third component
  (C) Electron donor

[II] Organometallic catalyst component
  (E) ⎰ (E-1) Organoaluminum oxy-compound and/or
      ⎱ (E-2) Lewis acid or ionic compound

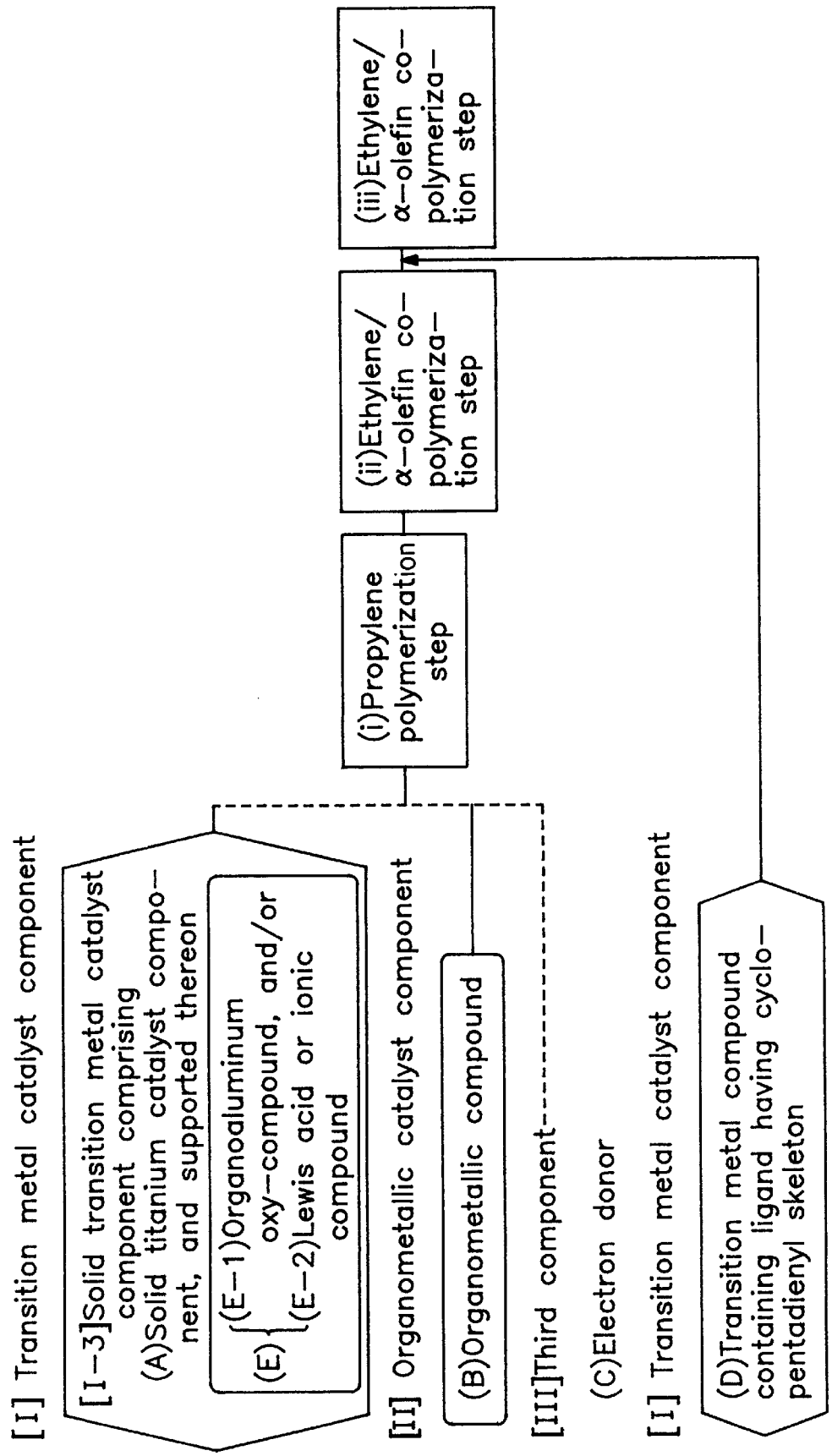

PROCESS FOR PREPARING OLEFIN POLYMER

TECHNICAL FIELD

The present invention relates to processes for preparing olefin polymers, and more particularly to processes for preparing olefin polymers having excellent impact strength as well as excellent mechanical strength such as rigidity.

BACKGROUND ART

Crystalline polypropylene has been conventionally known as a polymer having excellent rigidity, heat resistance and surface gloss. Also, a propylene block copolymer containing both of a polypropylene component and a rubber component has been known as a propylene polymer which has more improved impact resistance than the crystalline polypropylene.

The propylene polymers are characterized in that they have small specific gravity and can be easily recycled, so that they have been paid much attention in view of environmental protection and are desired to be applied to more extensive uses.

Therefore, the propylene polymers, particularly crystalline polypropylenes, are desired to be further improved in the impact strength.

For improving the impact strength of the propylene polymers, there have been conventionally known a method of forming a propylene block copolymer as described above and a method of adding a modifier such as polyethylene or a rubber-like material to the crystalline polypropylene so as to form a polypropylene composition. Examples of the rubber-like materials generally known include an amorphous or low-crystalline ethylene/propylene random copolymer (EPR), polyisobutylene and polybutadiene.

In order to improve the impact resistance by adding such rubber-like materials, they need to be added to the polypropylene in a large amount. However, a polypropylene composition containing a large amount of the rubber-like material is markedly deteriorated in the mechanical strength such as rigidity, heat resistance and surface hardness, though the impact resistance is improved.

For this reason, a polypropylene composition, to which an inorganic filler such as talc is also added together with the rubber-like material to thereby impart rigidity, is proposed.

However, the polypropylene composition containing a large amount of the rubber-like material has limitations in the improvement of rigidity given by adding the inorganic filler such as talc, and there is a problem in that the polypropylene composition cannot be applied to such a use as requires high rigidity.

Further, the propylene polymers obtained by the conventional processes do not always show sufficient rigidity and heat resistance depending on circumstances, resulting in limitations in their uses.

Accordingly, now desired is development of processes for preparing olefin polymers, by which propylene polymers having excellent impact strength as well as excellent mechanical strength such as rigidity, moldability and heat resistance can be obtained.

The present invention has been made under such circumstances as described above, and it is an object of the invention to provide processes for preparing olefin polymers, by which olefin polymers having excellent impact strength as well as excellent mechanical strength such as rigidity, moldability and heat resistance can be obtained.

DISCLOSURE OF THE INVENTION

The first process for preparing an olefin polymer according to the invention comprises:

carrying out (i) a step of homopolymerizing propylene or copolymerizing propylene and an α-olefin other than propylene to form a crystalline polypropylene component and (ii) a step of copolymerizing ethylene and an α-olefin of 3 to 20 carbon atoms to form a low-crystalline or non-crystalline ethylene/α-olefin copolymer component, in an arbitrary order in the presence of the olefin polymerization catalyst (1) so as to form a propylene block copolymer component, said catalyst (1) comprising:
  (A) a solid titanium catalyst component containing magnesium, titanium, halogen and an electron donor,
  (B) an organometallic compound, and optionally
  (C) an electron donor;
then adding an olefin polymerization catalyst (2) to the polymerization system, said catalyst (2) comprising:
  (D) a transition metal compound containing a ligand having cyclopentadienyl skeleton, and
  (E) (E-1) an organoaluminum oxy-compound, and/or (E-2) Lewis acid or an ionic compound; and
  (iii) copolymerizing ethylene and an α-olefin of 3 to 20 carbon atoms so as to form a low-crystalline or non-crystalline ethylene/α-olefin copolymer component.

The second process for preparing an olefin polymer according to the invention comprises:

carrying out (i) a step of homopolymerizing propylene or copolymerizing propylene and an α-olefin other than propylene to form a crystalline polypropylene component and (ii) a step of copolymerizing ethylene and an α-olefin of 3 to 20 carbon atoms to form a low-crystalline or non-crystalline ethylene/α-olefin copolymer component, in an arbitrary order in the presence of the olefin polymerization catalyst (3) so as to form a propylene block copolymer component, said catalyst (3) comprising:
  [I-1] a solid transition metal catalyst component comprising
    (A) a solid titanium catalyst component containing magnesium, titanium, halogen and an electron donor, and supported thereon,
    (D) a transition metal compound containing a ligand having cyclopentadienyl skeleton,
    (B) an organometallic compound, and optionally
    (C) an electron donor;
then adding (E) (E-1) an organoaluminum oxy-compound and/or (E-2) Lewis acid or an ionic compound to the polymerization system; and
  (iii) copolymerizing ethylene and an α-olefin of 3 to 20 carbon atoms so as to form an ethylene/α-olefin copolymer component.

In the second process for preparing an olefin polymer according to the invention, it is possible that the solid transition metal catalyst component [I-1] is replaced with a solid transition metal catalyst component [I-2] which comprises (D-1) a solid catalyst component comprising a transition metal compound containing a ligand having cyclopentadienyl skeleton and supported thereon (A-1) a titanium catalyst component containing magnesium, titanium, halogen and an electron donor, to form an olefin polymerization catalyst (4), and the catalyst (4) is used in place of the catalyst (3).

The third process for preparing an olefin polymer comprises:

carrying out (i) a step of homopolymerizing propylene or copolymerizing propylene and an α-olefin other than propylene to form a crystalline polypropylene component and (ii) a step of copolymerizing ethylene and an α-olefin of 3 to 20 carbon atoms to form a low-crystalline or non-crystalline ethylene/α-olefin copolymer component, in an arbitrary order in the presence of an olefin polymerization catalyst (5) so as to form a propylene block copolymer component, said catalyst (5) comprising:

[I-3] a solid transition metal catalyst component comprising
(A) a solid titanium catalyst component containing magnesium, titanium, halogen and an electron donor, and supported thereon,
(E) (E-1) an organoaluminum oxy-compound and/or (E-2) Lewis acid or an ionic compound,
(B) an organometallic compound, and optionally
(C) an electron donor;

then adding (D) a transition metal compound containing a ligand having cyclopentadienyl skeleton to the polymerization system; and
(iii) copolymerizing ethylene and an α-olefin of 3 to 20 carbon atoms so as to form an ethylene/α-olefin copolymer component.

BRIEF DESCRIPTION OF THE DRAWINGS

FIG. 3 is another flow chart showing the second process for preparing an olefin polymer according to the invention.

FIG. 4 is a flow chart showing the third process for preparing an olefin polymer according to the invention.

BEST MODE FOR CARRYING OUT THE INVENTION

Figure 1:
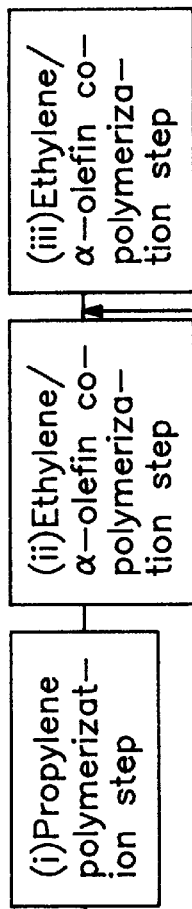
FIG. 1 is a flow chart showing the first process for preparing an olefin polymer according to the invention.
Figure 2:
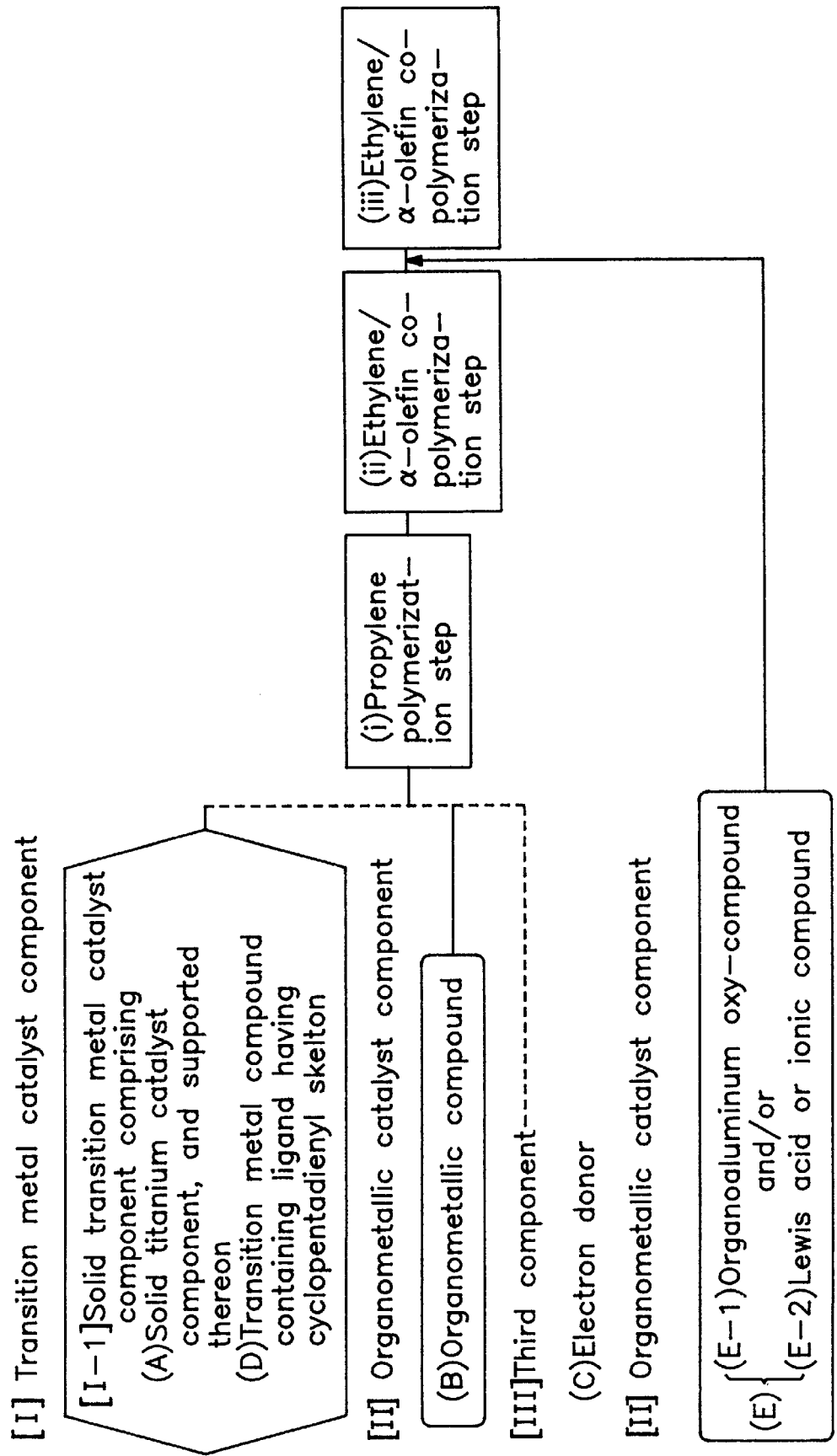
FIG. 2 is a flow chart showing the second process for preparing an olefin polymer according to the invention.

The processes for preparing olefin polymers according to the invention are described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

In the processes for preparing an olefin polymer according to the invention, an olefin polymer composed of a propylene block copolymer component and an ethylene/α-olefin copolymer component is prepared by polymerization.

In detail, a step (i) for preparing a crystalline polypropylene component and a step (ii) for preparing a low-crystalline or non-crystalline ethylene/α-olefin copolymer component are carried out in an arbitrary order using an olefin polymerization catalyst to thereby form a propylene block copolymer component, then other catalyst component is added to the polymerization system, and finally a step (iii) for preparing a low-crystalline or non-crystalline ethylene/α-olefin copolymer component is carried out, whereby an olefin polymer is prepared.

In the first process for preparing an olefin polymer according to the invention, the propylene block copolymer component is first formed using an olefin polymerization catalyst (1) which comprises (A) a solid titanium catalyst component, (B) an organometallic compound, and optionally, (C) an electron donor; then to the polymerization system is added an olefin polymerization catalyst (2) which comprises (D) a specific transition metal compound and (E) (E-1) an organoaluminum oxy-compound and/or (E-2) Lewis acid or an ionic compound; and (iii) a low-crystalline or non-crystalline ethylene/α-olefin copolymer component is formed, whereby an olefin polymer is prepared.

In the second process for preparing an olefin polymer according to the invention, the propylene block copolymer component is first formed using an olefin polymerization catalyst (3) which comprises [I-1] a solid transition metal catalyst component comprising (A) a solid titanium catalyst component and supported thereon (D) a transition metal compound containing a ligand having cyclopentadienyl skeleton, (B) an organometallic compound, and optionally, (C) an electron donor; then to the polymerization system is added (E) (E-1) an organoaluminum oxy-compound and/or (E-2) Lewis acid or an ionic compound; and (iii) an ethylene/α-olefin copolymer component is formed, whereby an olefin polymer is prepared.

In the second process for preparing an olefin polymer according to the invention, it is possible that the solid transition metal catalyst component [I-1] for forming the olefin polymerization catalyst (3) is replaced with a solid transition metal catalyst component [I-2] which comprises (D-1) a solid catalyst component comprising a transition metal compound containing a ligand having cyclopentadienyl skeleton and supported thereon (A-1) a titanium catalyst component containing magnesium, titanium, halogen and an electron donor, to form an olefin polymerization catalyst (4), and the catalyst (4) is used in place of the catalyst (3).

In the third process for preparing an olefin polymer according to the invention, the propylene block copolymer component is first formed using an olefin polymerization catalyst (5) which comprises [I-3] a solid transition metal catalyst component comprising (A) a solid titanium catalyst component and supported thereon (E) (E-1) an organoaluminum oxy-compound and/or (E-2) Lewis acid or an ionic compound, (B) an organometallic compound, and optionally, (C) an electron donor; then to the polymerization system is added (D) a transition metal compound containing a ligand having cyclopentadienyl skeleton; and (iii) an ethylene/α-olefin copolymer component is formed, whereby an olefin polymer is prepared.

Each catalyst component used in the processes for preparing an olefin polymer according to the invention is described below.

(A) Solid titanium catalyst component

The solid titanium catalyst component (A) used in the invention can be prepared by contacting the following magnesium compound, titanium compound and electron donor.

The titanium compound used for preparing the solid titanium catalyst component is, for example, a tetravalent titanium compound represented by the following formula:

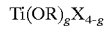

wherein R is a hydrocarbon group, X is a halogen atom, and $0 \leq g \leq 4$.

Examples of the titanium compounds include:

titanium tetrahalides, such as $TiCl_4$, $TiBr_4$ and $TiI_4$;

alkoxytitanium trihalides, such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-iso-C_4H_9)Br_3$;

dialkoxytitanium dihalides, such as $Ti(OCH_3)_2Cl_2$, $Ti(OC_2H_5)_2Cl_2$, $Ti(O-n-C_4H_9)_2Cl_2$ and $Ti(OC_2H_5)_2Br_2$;

trialkoxytitanium monohalides, such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitaniums, such as $Ti(OCH_3)_4$, $Ti(OC_2H_5)_4$, $Ti(O-n-C_4H_9)_4$, $Ti(O-iso-C_4H_9)_4$ and $Ti(O-2-ethylhexyl)_4$.

Of these, preferable are halogen-containing titanium compounds, more preferable are titanium tetrahalides, and particularly preferable is titanium tetrachloride. These titanium compounds can be used singly or in combination of two or more kinds. Further, these titanium compounds may be diluted with, for example, hydrocarbon compounds or halogenated hydrocarbon compounds.

The magnesium compound used for preparing the solid titanium catalyst component (A) includes a magnesium compound having reduction ability and a magnesium compound having no reduction ability.

The magnesium compound having reduction ability is, for example, a magnesium compound having magnesium-to-carbon bond or magnesium-to-hydrogen bond. Examples of the magnesium compounds having reduction ability include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium and butylmagnesium hydride. These magnesium compounds can be used singly, or may be used together with the later-described metallic compounds to form complex compounds. These magnesium compounds may be liquid or solid, and may be derived from reacting metallic magnesium with the corresponding compound. Further, the magnesium compounds may be derived from metallic magnesium by the above-mentioned method during the preparation of the catalyst.

Examples of the magnesium compounds having no reduction ability include magnesium halides, such as magnesium chloride, magnesium bromide, magnesium iodide and magnesium fluoride; alkoxymagnesium halides, such as methoxymagnesium chloride, ethoxymagnesium chloride, isopropoxymagnesium chloride, butoxymagnesium chloride and octoxymagnesium chloride; aryloxymagnesium halides, such as phenoxymagnesium chloride and methylphenoxymagnesium chloride; alkoxymagnesiums, such as ethoxymagnesium, isopropoxymagnesium, butoxymagnesium, n-octoxymagnesium and 2-ethylhexoxymagnesium; aryloxymagnesiums, such as phenoxymagnesium and dimethylphenoxymagnesium; and magnesium carboxylates, such as magnesium laurate and magnesium stearate.

The magnesium compounds having no reduction ability may be compounds derived from the aforementioned magnesium compounds having reduction ability or compounds derived during the preparation of the catalyst component. For deriving the magnesium compounds having no reduction ability from the magnesium compounds having reduction ability, for example, the magnesium compounds having reduction ability are brought into contact with halogens, halogen compounds, such as halogen-containing organosilicon compounds and halogen-containing aluminum compounds, compounds having active carbon-to-oxygen bond, such as alcohols, esters, ketones and aldehydes, or polysiloxane compounds.

In the present invention, other than the magnesium compounds having reduction ability and the magnesium compounds having no reduction ability, there can be used complex compounds or composite compounds of the above magnesium compounds and other metals, or mixtures of the above magnesium compounds and other metallic compounds. The magnesium compounds mentioned above may be used in combination of two or more kinds.

For preparing the solid titanium catalyst component (A), other various magnesium compounds than the above-mentioned ones are employable, but it is preferable that the magnesium compound takes a form of a halogen-containing magnesium compound in the finally obtained solid titanium catalyst component (A). Therefore, when a magnesium compound containing no halogen is used, the magnesium compound is preferably contacted with a halogen-containing compound during the preparation of the catalyst component.

Of the above compounds, preferable are magnesium compounds having no reduction ability, more preferable are halogen-containing magnesium compounds, and particularly preferable are magnesium chloride, alkoxymagnesium chloride and aryloxymagnesium chloride.

The solid titanium catalyst component (A) used in the invention is formed by contacting such a magnesium compound described above with the aforesaid titanium compound and an electron donor (a).

Examples of the electron donor (a) used for preparing the solid titanium catalyst component (A) include alcohols, phenols, ketones, aldehydes, carboxylic acids, organic acid halides, organic or inorganic esters, ethers, acid amides, acid anhydrides, ammonia, amines, nitrites, isocyanates, nitrogen-containing cyclic compounds and oxygen-containing cyclic compounds. More specifically, there can be mentioned:

alcohols having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol;

halogen-containing alcohols having 1 to 18 carbon atoms, such as trichloromethanol, trichloroethanol and trichlorohexanol;

phenols having 6 to 20 carbon atoms, which may have a lower alkyl group, such as phenol, cresol, xylenol, ethylphenol, propylphenol, nonylphenol, cumylphenol and naphthol;

ketones having 3 to 15 carbon atoms, such as acetone, methyl ethyl ketone, methyl isobutyl ketone, acetophenone, benzophenone and benzoquinone;

aldehydes having 2 to 15 carbon atoms, such as acetaldehyde, propionaldehyde, octylaldehyde, benzaldehyde, tolualdehyde and naphthaldehyde;

organic esters having 2 to 30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumarin, phthalide and ethyl carbonate;

acid halides having 2 to 15 carbon atoms, such as acetyl chloride, benzoyl chloride, toluyl chloride and anisoyl chloride;

ethers having 2 to 20 carbon atoms, such as methyl ether, ethyl ether, isopropyl ether, butyl ether, amyl ether, tetrahydrofuran, anisole and diphenyl ether;

acid amides, such as N,N-dimethylacetamide, N,N-diethylbenzamide and N,N-dimethyltoluamide;

amines, such as methylamine, ethylamine, dimethylamine, diethylamine, trimethylamine, triethylamine, tributylamine, tribenzylamine, tetramethylenediamine and hexamethylenediamine;

nitriles, such as acetonitrile, benzonitrile and trinitrile;

acid anhydrides, such as acetic anhydride, phthalic anhydride and benzoic anhydride;

pyrroles, such as pyrrole, methylpyrrole and dimethylpyrrole;

pyrrolines;

pyrrolidines;

indoles;

pyridines, such as pyridine, methylpyridine, ethylpyridine, propylpyridine, dimethylpyridine, ethylmethylpyridine, trimethylpyridine, phenylpyridine, benzylpyridine and pyridine chloride;

nitrogen-containing cyclic compounds, such as piperidines, quinolines and isoquinolines; and oxygen-containing cyclic compounds, such as tetrahydrofuran, 1,4-cineol, 1,8-cineol, pinolfuran, methylfuran, dimethylfuran, diphenylfuran, benzofuran, coumaran, phthalan, tetrahydropyran, pyran and dihydropyran.

Preferred examples of the organic esters include polycarboxylic esters having skeletons represented by the following formulas.

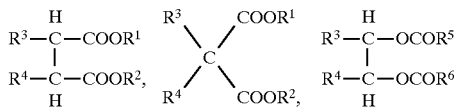

In the above formulas, $R^1$ is a substituted or unsubstituted hydrocarbon group, $R^2$, $R^5$ and $R^6$ are each hydrogen or a substituted or unsubstituted hydrocarbon group, $R^3$ and $R^4$ are each hydrogen or a substituted or unsubstituted hydrocarbon group, and at least one of $R^3$ and $R^4$ is preferably a substituted or unsubstituted hydrocarbon group. $R^3$ and $R^4$ may be linked to each other to form a cyclic structure. When the hydrocarbon groups $R^1$ to $R^6$ are substituted, the substituents contain hetero atoms such as N, O and S and have groups such as C—O—C, COOR, COOH, OH, SO$_3$H, —C—N—C— and NH$_2$.

Particular examples of the polycarboxylic esters include:

aliphatic polycarboxylic esters, such as diethyl succinate, dibutyl succinate, diethyl methylsuccinate, diisobutyl α-methylglutarate, diethyl methylmalonate, diethyl ethylmalonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, diisopropyl β-methylglutarate, diallyl ethylsuccinate, di-2-ethylhexyl fumarate, diethyl itaconate and dioctyl citraconate;

alicyclic polycarboxylic esters, such as diethyl 1,2-cyclohexanecarboxylate, diisobutyl 1,2-cyclohexanecarboxylate, diethyl tetrahydrophthalate and diethyl nadiate;

aromatic polycarboxylic esters, such as monoethyl phthalate, dimethyl phthalate, methylethyl phthalate, monoisobutyl phthalate, diethyl phthalate, ethylisobutyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; and heterocyclic polycarboxylic esters, such as 3,4-furandicarboxilic acid.

Other examples of the polycarboxylic esters are esters of long chain dicarboxylic acids, such as diethyl adipate, diisobutyl adipate, diisopropyl sebacate, di-n-butyl sebacate, di-n-octyl sebacate and di-2-ethylhexyl sebacate.

In the present invention, an organosilicon compound or a polyether compound, which is described later as an electron donor (C), is also employable as the electron donor (a).

In addition to the above compounds, also employable are water, and anionic, cationic and nonionic surface active agents.

Of the above compounds, preferably used as the electron donors (a) are carboxylic esters, more preferably used are polycarboxylic esters, and particularly preferably used are phthalic esters.

These compounds can be used in combination of two or more kinds.

In the contact of the titanium compound, the magnesium compound and the electron donor, a particle carrier can be used to form a carrier support type solid titanium catalyst component (A).

Examples of the carriers include Al$_2$O$_3$, SiO$_2$, B$_2$O$_3$, MgO, CaO, TiO$_2$, ZnO, Zn$_2$O, SnO$_2$, BaO, ThO and resins such as a styrene/divinylbenzene copolymer. Of these, SiO$_2$, Al$_2$O$_3$, MgO, ZnO and Zn$_2$O are preferable.

The above components may be contacted in the presence of reaction assistants such as silicon, phosphorus and aluminum.

The solid titanium catalyst component (A) can be prepared by contacting the titanium compound, the magnesium compound and the electron donor, and can be prepared by various processes including conventionally known processes.

Some examples of the processes for preparing the solid titanium catalyst component (A) are briefly described below.

(1) A solution of a magnesium compound and an electron donor in a hydrocarbon solvent is contacted with a titanium compound, after or simultaneously with precipitating a solid by contacting the solution with an organometallic compound.

(2) A complex of a magnesium compound and an electron donor is contacted with an organometallic compound and then contacted with a titanium compound.

(3) A contact product of an inorganic carrier and an organomagnesium compound is contacted with a titanium compound, preferably together with an electron donor. In this process, the contact product may be previously contacted with a halogen-containing compound and/or an organometallic compound.

(4) An inorganic or organic carrier on which a magnesium compound is supported is prepared from a mixture of an inorganic or organic carrier and a solution containing a magnesium compound, an electron donor and optionally a hydrocarbon solvent. Then, the inorganic or organic carrier on which the magnesium compound is supported is contacted with a titanium compound.

(5) A solution containing a magnesium compound, a titanium compound, an electron donor and optionally a hydrocarbon solvent is contacted with an inorganic or organic carrier to obtain a solid titanium catalyst component in which magnesium and titanium are supported.

(6) An organomagnesium compound in a liquid state is contacted with a halogen-containing titanium compound. In this process, an electron donor is used at least once.

(7) An organomagnesium compound in a liquid state is contacted with a halogen-containing compound and then contacted with a titanium compound. In this process, an electron donor is used at least once.

(8) An alkoxy group-containing magnesium compound is contacted with a halogen-containing titanium compound. In this process, an electron donor is used at least once.

(9) A complex of an alkoxy group-containing magnesium compound and an electron donor is contacted with a titanium compound.

(10) A complex of an alkoxy group-containing magnesium compound and an electron donor is contacted with an organometallic compound and then contacted with a titanium compound.

(11) A magnesium compound, an electron donor and a titanium compound are contacted and reacted in an arbitrary order. Prior to the reaction, each component may be pretreated with an electron donor and/or an organometallic compound or a reaction assistant such as a halogen-containing silicon compound. In this process, an electron donor is used preferably at least once.

(12) A liquid magnesium compound having no reduction ability is reacted with a liquid titanium compound preferably in the presence an electron donor to precipitate a solid magnesium/titanium complex.

(13) A reaction product obtained by the process (12) is further reacted with a titanium compound.

(14) A reaction product obtained by the process (11) or (12) is further reacted with an electron donor and a titanium compound.

(15) A solid obtained by pulverizing a magnesium compound and preferably an electron donor and a titanium compound is treated with any one of halogen, a halogen compound and an aromatic hydrocarbon. This process may include a step of pulverizing either a magnesium compound only, a complex compound of a magnesium compound and an electron donor, or both of a magnesium compound and a titanium compound. It is possible that the pulverizate is pretreated with a reaction assistant and then treated with halogen or the like. Examples of the reaction assistants include organometallic compounds and halogen-containing silicon compounds.

(16) A magnesium compound is pulverized and then contacted with a titanium compound. In this process, an electron donor or a reaction assistant is preferably used in the pulverization stage and/or the reaction stage.

(17) A compound obtained by any one of the processes (11) to (16) is treated with halogen, a halogen compound or an aromatic hydrocarbon.

(18) A contact product of a metallic oxide, an organomagnesium compound and a halogen-containing compound is contacted with a titanium compound and preferably with an electron donor.

(19) A magnesium compound such as a magnesium salt of an organic acid, alkoxymagnesium or aryloxymagnesium is reacted with a titanium compound and/or a halogen-containing hydrocarbon and optionally with an electron donor.

(20) A hydrocarbon solution containing at least a magnesium compound and alkoxytitanium is contacted with a titanium compound and/or an electron donor. In this process, a halogen-containing compound such as a halogen-containing silicon compound is preferably allowed to coexist.

(21) A liquid magnesium compound having no reduction ability is reacted with an organometallic compound to precipitate a solid magnesium/metal (aluminum) complex, and the complex is then reacted with an electron donor and a titanium compound.

The amounts of the components used for preparing the solid titanium catalyst component (A) vary depending on the processes and cannot be decided indiscriminately. However, for example, the electron donor (a) is used in an amount of 0.01 to 5 mol, preferably 0.1 to 1 mol, based on 1 mol of the magnesium compound, and the titanium compound is used in an amount of 0.01 to 1,000 mol, preferably 0.1 to 200 mol, based on 1 mol of the magnesium compound.

The solid titanium catalyst component (A) obtained as above contains magnesium, titanium, halogen and an electron donor.

In the solid titanium catalyst component (A), it is desirable that the halogen/titanium atomic ratio is in the range of about 2 to 200, preferably about 4 to 100, and the electron donor/titanium (molar ratio) is in the range of about 0.01 to 100, preferably about 0.2 to 10, and the magnesium/titanium (atomic ratio) is in the range of about 1 to 100, preferably about 2 to 50.

(B) Organometallic compound

The organometallic compound (B) used for forming the olefin polymerization catalyst in the invention includes the below-described organometallic compounds containing metals of Group I to Group III of the periodic table.

(B-1) Organoaluminum compounds represented by the following formula:

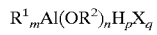

wherein $R^1$ and $R^2$ are each a hydrocarbon group of usually 1 to 15 carbon atoms, preferably 1 to 4 carbon atoms, they may be the same as or different from each other, X is a halogen atom, $0<m\leq 3$, $0\leq n<3$, $0\leq p<3$, $0\leq q<3$, and $m+n+p+q=3$.

(B-2) Alkyl complex compounds of Group I metals and aluminum, which are represented by the following formula:

wherein $M^1$ is Li, Na or K, and $R^1$ is the same as above.

(B-3) Dialkyl compounds of Group II metals or Group III metals, which are represented by the following formula:

wherein $R^1$ and $R^2$ are the same as above, and $M^2$ is Mg, Zn or Cd.

Examples of the organoaluminum compounds (B-1) include:

compounds of the formula $R^1_m Al(OR^2)_{3-m}$ ($R^1$ and $R^2$ are the same as above, and m is preferably a number of $1.5\leq m\leq 3$), compounds of the formula $R^1_m AlX_{3-m}$ ($R^1$ is the same as above, X is halogen, and m is preferably a number of $0<m<3$), compounds of the formula $R^1_m AlH_{3-m}$ ($R^1$ is the same as above, and m is preferably a number of $2\leq m<3$), and compounds of the formula $R^1_m Al(OR^2)_n X_q$ ($R^1$ and $R^2$ are the same as above, X is halogen, $0<m\leq 3$, $0\leq n<3$, $0\leq q<3$, and $m+n+q=3$).

More specific examples of the organoaluminum compounds (B-1) include:

trialkylaluminums, such as triethylaluminum and tributylaluminum;

trialkenylaluminums, such as triisoprenylaluminum;

dialkylaluminum alkoxides, such as diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums having an average composition such as represented by $R^1{}_{2.5}Al(OR^2)_{0.5}$;

dialkylaluminum halides, such as diethylaluminum chloride, dibutylaluminum chloride and diethylaluminum bromide;

partially halogenated alkylaluminums, e.g., alkylaluminum sesquihalides, such as ethylaluminum sesquichloride, butylaluminum sesquichloride and ethylaluminum sesquibromide, and alkylaluminum dihalides, such as ethylaluminum dichloride, propylaluminum dichloride and butylaluminum dibromide;

dialkylaluminum hydrides, such as diethylaluminum hydride and dibutylaluminum hydride;

partially hydrogenated alkylaluminums, e.g., alkylaluminum dihydrides, such as ethylaluminum dihydride and propylaluminum dihydride; and partially alkoxylated or halogenated alkylaluminums, such as ethylaluminum ethoxychloride, butylaluminum butoxychloride and ethylaluminum ethoxybromide.

As compounds analogous to the organoaluminum compounds (B-1), there can be mentioned compounds wherein two or more aluminum atoms are linked to each other through an oxygen atom or a nitrogen atom. Examples of such compounds include $(C_2H_5)_2AlOAl(C_2H_5)_2$, $(C_4H_9)_2AlOAl(C_4H_9)_2$, $(C_2H_5)_2AlN(C_2H_5)Al(C_2H_5)_2$, and aluminoxanes such as methylaluminoxane. However, the aluminoxanes are not included in the organometallic compound (B) for forming the later-described olefin polymerization catalyst (3) or (4).

Examples of the compounds (B-2) include $LiAl(C_2H_5)_4$ and $LiAl(C_7H_{15})_4$.

Of the compounds mentioned above, the organoaluminum compounds are preferably employed.

(C) Electron donor

In the present invention, an organosilicon compound (C-1) or a compound (C-2) having two or more ether linkages present through plural atoms (sometimes referred to as "polyether compound" hereinafter) is employable as the electron donor (C).

(C-1) Organosilicon compound

The organosilicon compound employable in the invention is represented by the following formula (i):

$$R^a{}_n\text{—Si—}(OR^b)_{4-n} \qquad \text{(i)}$$

wherein n is 1, 2 or 3; when n is 1, $R^a$ is a secondary or tertiary hydrocarbon group; when n is 2 or 3, at least one of $R^a$ is a secondary or tertiary hydrocarbon group, $R^a$'s may be the same as or different from each other; $R^b$ is a hydrocarbon group of 1 to 4 carbon atoms; and when 4—n is 2 or 3, $OR^b$'s may be the same as or different from each other.

In the organosilicon compound of the formula (i), the secondary or tertiary hydrocarbon group is, for example, a cyclopentyl group, a cyclopentenyl group, a cyclopentadienyl group, a substituted cyclopentyl, cyclopentenyl or cyclopentadienyl group, or a hydrocarbon group wherein the carbon adjacent to Si is a secondary or tertiary carbon.

Examples of the substituted cyclopentyl groups include cyclopentyl groups having alkyl groups, such as 2-methylcyclopentyl, 3-methylcyclopentyl, 2-ethylcyclopentyl, 2-n-butylcyclopentyl, 2,3-dimethylcyclopentyl, 2,4-dimethylcyclopentyl, 2,5-dimethylcyclopentyl, 2,3-diethylcyclopentyl, 2,3,4-trimethylcyclopentyl, 2,3,5-trimethylcyclopentyl, 2,3,4-triethylcyclopentyl, tetramethylcyclopentyl and tetraethylcyclopentyl.

Examples of the substituted cyclopentenyl groups include cyclopentenyl groups having alkyl groups, such as 2-methylcyclopentenyl, 3-methylcyclopentenyl, 2-ethylcyclopentenyl, 2-n-butylcyclopentenyl, 2,3-dimethylcyclopentenyl, 2,4-dimethylcyclopentenyl, 2,5-dimethylcyclopentenyl, 2,3,4-trimethylcyclopentenyl, 2,3,5-trimethylcyclopentenyl, 2,3,4-triethylcyclopentenyl, tetramethylcyclopentenyl and tetraethylcyclopentenyl.

Examples of the substituted cyclopentadienyl groups include cyclopentadienyl groups having alkyl groups, such as 2-methylcyclopentadienyl, 3-methylcyclopentadienyl, 2-ethylcyclopentadienyl, 2-n-butylcyclopentadienyl, 2,3-dimethylcyclopentadienyl, 2,4-dimethylcyclopentadienyl, 2,5-dimethylcyclopentadienyl, 2,3-diethylcyclopentadienyl, 2,3,4-trimethylcyclopentadienyl, 2,3,5-trimethylcyclopentadienyl, 2,3,4-triethylcyclopentadienyl, 2,3,4,5-tetramethylcyclopentadienyl, 2,3,4,5-tetraethylcyclopentadienyl, 1,2,3,4,5-pentamethylcyclopentadienyl and 1,2,3,4,5-pentaethylcyclopentadienyl.

Examples of the hydrocarbon groups wherein the carbon adjacent to Si is a secondary carbon include i-propyl, s-butyl, s-amyl and α-methylbenzyl. Examples of the hydrocarbon groups wherein the carbon adjacent to Si is a tertiary carbon include t-butyl, t-amyl, α,α'-dimethylbenzyl and adamantyl.

When n is 1, examples of the organosilicon compounds represented by the formula (i) include trialkoxysilanes, such as cyclopentyltrimethoxysilane, 2-methylcyclopentyltrimethoxysilane, 2,3-dimethylcyclopentyltrimethoxysilane, cyclopentyltriethoxysilane, iso-butyltriethoxysilane, t-butyltriethoxysilane, cyclohexyltrimethoxysilane, cyclohexyltriethoxysilane, 2-norbornanetrimethoxysilane and 2-norbornanetriethoxysilane.

When n is 2, examples of the organosilicon compounds represented by the formula (i) include dialkoxysilanes, such as dicyclopentyldiethoxysilane, t-butylmethyldiethoxysilane, t-amylmethyldiethoxysilane, cyclohexylmethyldiethoxysilane, t-butylmethyldimethoxysilane, dicyclohexyldimethoxysilane, cyclohexylmethyldimethoxysilane and 2-norbornanemethyldimethoxysilane.

When n is 2, the organosilicon compound of the formula (i) includes a dimethoxy compound represented by the following formula (ii):

wherein $R^a$ and $R^c$ are each independently a cyclopentyl group, a substituted cyclopentyl group, a cyclopentenyl group, a substituted cyclopentenyl group, a cyclopentadienyl group, a substituted cyclopentadienyl group or a hydrocarbon group wherein the carbon adjacent to Si is a secondary or tertiary carbon.

Examples of the organosilicon compounds represented by the formula (ii) include:
    dicyclopentyldimethoxysilane, dicyclopentenyldimethoxysilane,
dicyclopentadienyldimethoxysilane,
di-t-butyldimethoxysilane,
di(2-methylcyclopentyl)dimethoxysilane,
di(3-methylcyclopentyl)dimethoxysilane,
di(2-ethylcyclopentyl)dimethoxysilane,
di(2,3-dimethylcyclopentyl)dimethoxysilane,
di(2,4-dimethylcyclopentyl)dimethoxysilane,
di(2,5-dimethylcyclopentyl)dimethoxysilane,
di(2,3-diethylcyclopentyl)dimethoxysilane,
di(2,3,4-trimethylcyclopentyl)dimethoxysilane,
di(2,3,5-trimethylcyclopentyl)dimethoxysilane,
di(2,3,4-triethylcyclopentyl)dimethoxysilane,
di(tetramethylcyclopentyl)dimethoxysilane,
di(tetraethylcyclopentyl)dimethoxysilane,
di(2-methylcyclopentenyl)dimethoxysilane,
di(3-methylcyclopentenyl)dimethoxysilane,
di(2-ethylcyclopentenyl)dimethoxysilane,
di(2-n-butylcyclopentenyl)dimethoxysilane,
di(2,3-dimethylcyclopentenyl)dimethoxysilane,
di(2,4-dimethylcyclopentenyl)dimethoxysilane,
di(2,5-dimethylcyclopentenyl)dimethoxysilane,
di(2,3,4-trimethylcyclopentenyl)dimethoxysilane,
di(2,3,5-trimethylcyclopentenyl)dimethoxysilane,
di(2,3,4-triethylcyclopentenyl)dimethoxysilane,
di(tetramethylcyclopentenyl)dimethoxysilane,
di(tetraethylcyclopentenyl)dimethoxysilane,
di(2-methylcyclopentadienyl)dimethoxysilane,
di(3-methylcyclopentadienyl)dimethoxysilane,
di(2-ethylcyclopentadienyl)dimethoxysilane,
di(2-n-butylcyclopentadienyl)dimethoxysilane,
di(2,3-dimethylcyclopentadienyl)dimethoxysilane,
di(2,4-dimethylcyclopentadienyl)dimethoxysilane,
di(2,5-dimethylcyclopentadienyl)dimethoxysilane,
di(2,3-diethylcyclopentadienyl)dimethoxysilane,
di(2,3,4-trimethylcyclopentadienyl)dimethoxysilane,
di(2,3,5-trimethylcyclopentadienyl)dimethoxysilane,
di(2,3,4-triethylcyclopentadienyl)dimethoxysilane,
di(2,3,4,5-tetramethylcyclopentadienyl)dimethoxysilane,
di(2,3,4,5-tetraethylcyclopentadienyl)dimethoxysilane,
di(1,2,3,4,5-pentamethylcyclopentadienyl)dimethoxysilane,
di(1,2,3,4,5-pentaethylcyclopentadienyl)dimethoxysilane,
di-t-amyldimethoxysilane,
di((αα'-dimethylbenzyl)dimethoxysilane,
di(adamantyl)dimethoxysilane,
adamantyl-t-butyldimethoxysilane,
cyclopentyl-t-butyldimethoxysilane,
diisopropyldimethoxysilane,
di-s-butyldimethoxysilane,
di-s-amyldimethoxysilane, and
isopropyl-s-butyldimethoxysilane.

When n is 3, examples of the organosilicon compounds represented by the formula (i) include monoalkoxysilanes, such as tricyclopentylmethoxysilane,
tricyclopentylethoxysilane,
dicyclopentylmethylmethoxysilane,
dicyclopentylethylmethoxysilane,
dicyclopentylmethylethoxysilane,
cyclopentyldimethylmethoxysilane,
cyclopentyldiethylmethoxysilane and
cyclopentyldimethylethoxysilane.

Also employable as the organosilicon compound (C-1) is an organosilicon compound represented by the following formula (iii):

$$R_n Si(OR')_{4-n} \qquad (iii)$$

wherein R and R' are each a hydrocarbon group, and 0<n<4.

Examples of the organosilicon compounds represented by the formula (iii) include:
trimethylmethoxysilane, trimethylethoxysilane, trimethylphenoxysilane,
dimethyldimethoxysilane, dimethyldiethoxysilane, diisopropyldimethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane,
methyltrimethoxysilane, methyltriethoxysilane, ethyltrimethoxysilane, ethyltriethoxysilane, vinyltrimethoxysilane, vinyltriethoxysilane, n-propyltriethoxysilane, n-butyltriethoxysilane, decyltrimethoxysilane, decyltriethoxysilane, ethyltriisopropoxysilane, vinyltributoxysilane, phenyltrimethoxysilane, phenyltriethoxysilane and methyltriallyloxysilane.

As compounds analogous to the organosilicon compounds of the formula (iii), there can be mentioned, for example, γ-chloropropyltrimethoxysilane, γ-aminopropyltriethoxysilane, chlorotriethoxysilane, ethyl silicate, butyl silicate, vinyltris(β-methoxyethoxysilane), vinyltriacetoxysilane and dimethyltetraethoxydisiloxane.

The organosilicon compound of the formula (iii) may be the same as the organosilicon compound of the formula (i).

The organosilicon compounds mentioned above may be used in combination of two or more kinds.

Of the above compounds, dimethoxysilanes, particularly dimethoxysilanes represented by the formula (ii), are preferably used in the invention. Among them, dicyclopentyldimethoxysilane, di-t-butyldimethoxysilane, di(2-methylcyclopentyl)dimethoxysilane, di(3-methylcyclopentyl)dimethoxysilane and di-t-amyldimethoxysilane are preferable.

(C-2) Polyether compound

In the compound having two or more ether linkages present through plural atoms (polyether compound) used in the invention, the atom present between the ether linkages is at least one kind of atom selected from carbon, silicon, oxygen, sulfur, phosphorus and boron, and the number of atoms is two or more. Of such compounds, preferable are compounds in which relatively bulky substituents, specifically those having two or more carbon atoms (preferably three or more carbon atoms) and having linear, branched or cyclic structure (preferably branched or cyclic structure), are bonded to the atoms present between the ether linkages. Also, compounds in which the atoms present between the two or more ether linkages include plural carbon atoms (preferably 3 to 20 carbon atoms, more preferably 3 to 10 carbon atoms, particularly preferably 3 to 7 carbon atoms) are preferable.

The polyether compound (C-2) is, for example, a compound represented by the following formula:

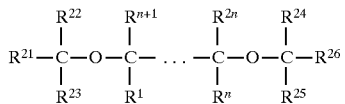

wherein n is an integer of $2 \leq n \leq 10$, $R^1$ to $R^{26}$ are each a substituent having at least one element selected from carbon, hydrogen, oxygen, halogen, nitrogen, sulfur, phosphorus, boron and silicon; groups optionally selected from $R^1$ to $R^{26}$, preferably from $R^1$ to $R^{2n}$, may form in cooperation a ring other than a benzene ring; and the main chain may contain an atom other than carbon.

Listed below are examples of the polyether compounds (C-2).

2-(2-Ethylhexyl)-1,3-dimethoxypropane,
2-Isopropyl-1,3-dimethoxypropane,
2-Butyl-1,3-dimethoxypropane,
2-s-Butyl-1,3-dimethoxypropane,
2-Cyclohexyl-1,3-dimethoxypropane,
2-Phenyl-1,3-dimethoxypropane,
2-Cumyl-1,3-dimethoxypropane,
2-(2-Phenylethyl)-1,3-dimethoxypropane,
2-(2-Cyclohexylethyl)-1,3-dimethoxypropane,
2-(p-Chlorophenyl)-1,3-dimethoxypropane,
2-(Diphenylmethyl)-1,3-dimethoxypropane,
2-(1-Naphthyl)-1,3-dimethoxypropane,
2-(2-Fluorophenyl)-1,3-dimethoxypropane,
2-(1-Decahydronaphthyl)-1,3-dimethoxypropane,
2-(p-t-Butylphenyl)-1,3-dimethoxypropane,
2,2-Dicyclohexyl-1,3-dimethoxypropane,
2,2-Dicyclopentyl-1,3-dimethoxypropane,
2,2-Diethyl-1,3-dimethoxypropane,
2,2-Dipropyl-1,3-dimethoxypropane,
2,2-Diisopropyl-1,3-dimethoxypropane,
2,2-Dibutyl-1,3-dimethoxypropane,
2-Methyl-2-propyl-1,3-dimethoxypropane,
2-Methyl-2-benzyl-1,3-dimethoxypropane,
2-Methyl-2-ethyl-1,3-dimethoxypropane,
2-Methyl-2-isopropyl-1,3-dimethoxypropane,
2-Methyl-2-phenyl-1,3-dimethoxypropane,
2-Methyl-2-cyclohexyl-1,3-dimethoxypropane,
2,2-Bis(p-chlorophenyl)-1,3-dimethoxypropane,
2,2-Bis(2-cyclohexylethyl)-1,3-dimethoxypropane,
2-Methyl-2-isobutyl-1,3-dimethoxypropane,
2-Methyl-2-(2-ethylhexyl)-1,3-dimethoxypropane,
2,2-Diisobutyl-1,3-dimethoxypropane,
2,2-Diphenyl-1,3-dimethoxypropane,
2,2-Dibenzyl-1,3-dimethoxypropane,
2,2-Bis(cyclohexylmethyl)-1,3-dimethoxypropane,
2,2-Diisobutyl-1,3-diethoxypropane,
2,2-Diisobutyl-1,3-dibutoxypropane,
2-Isobutyl-2-isopropyl-1,3-dimethoxypropane,
2-(1-Methylbutyl)-2-isopropyl-1,3-dimethoxypropane,
2-(1-Methylbutyl)-2-s-butyl-1,3-dimethoxypropane,
2,2-Di-s-butyl-1,3-dimethoxypropane,
2,2-Di-t-butyl-1,3-dimethoxypropane,
2,2-Dineopentyl-1,3-dimethoxypropane,
2-Isopentyl-2-isopropyl-1,3-dimethoxypropane,
2-Phenyl-2-isopropyl-1,3-dimethoxypropane,
2-Phenyl-2-s-butyl-1,3-dimethoxypropane,
2-Benzyl-2-isopropyl-1,3-dimethoxypropane,
2-Benzyl-2-s-butyl-1,3-dimethoxypropane,
2-Phenyl-2-benzyl-1,3-dimethoxypropane,
2-Cyclopentyl-2-isopropyl-1,3-dimethoxypropane,
2-Cyclopentyl-2-s-butyl-1,3-dimethoxypropane,
2-Cyclohexyl-2-isopropyl-1,3-dimethoxypropane,
2-Cyclohexyl-2-s-butyl-1,3-dimethoxypropane,
2-Isopropyl-2-s-butyl-1,3-dimethoxypropane,
2-Cyclohexyl-2-cyclohexylmethyl-1,3-dimethoxypropane,
2,3-Diphenyl-1,4-diethoxybutane,
2,3-Dicyclohexyl-1,4-diethoxybutane,
2,2-Dibenzyl-1,4-diethoxybutane,
2,3-Dicyclohexyl-1,4-diethoxybutane,
2,3-Diisopropyl-1,4-diethoxybutane,
2,2-Bis(p-methylphenyl)-1,4-dimethoxybutane,
2,3-Bis(p-chlorophenyl)-1,4-dimethoxybutane,
2,3-Bis(p-fluorophenyl)-1,4-dimethoxybutane,
2,4-Diphenyl-1,5-dimethoxypentane,
2,5-Diphenyl-1,5-dimethoxyhexane, 2,4-Diisopropyl-1,5-dimethoxypentane,
2,4-Diisobutyl-1,5-dimethoxypentane,
2,4-Diisoamyl-1,5-dimethoxypentane,
3-Methoxymethyltetrahydrofuran,
3-Methoxymethyldioxane,
1,3-Diisobutoxypropane,
1,2-Diisobutoxypropane,
1,2-Diisobutoxyethane,
1,3-Diisoamyloxypropane,
1,3-Diisoneopentyloxyethane,
1,3-Dineopentyloxypropane,
2,2-Tetramethylene-1,3-dimethoxypropane,
2,2-Pentamethylene-1,3-dimethoxypropane,
2,2-Hexamethylene-1,3-dimethoxypropane,
1,2-Bis(methoxymethyl)cyclohexane,
2,8-Dioxaspiro[5,5]undecane,
3,7-Dioxabicyclo[3,3,1]nonane,
3,7-Dioxabicyclo[3,3,0]octane,
3,3-Diisobutyl-1,5-oxononane,
6,6-Diisobutyldioxyheptane,
1,1-Dimethoxymethylcyclopentane,
1,1-Bis(dimethoxymethyl)cyclohexane,
1,1-Bis(methoxymethyl)bicyclo[2,2,1]heptane,
1,1-Dimethoxymethylcyclopentane,
2-Methyl1-2-methoxymethyl-1,3-dimethoxypropane,
2-Cyclohexyl-2-ethoxymethyl-1,3-diethoxypropane,
2-Cyclohexyl-2-methoxymethyl-1,3-dimethoxypropane,
2,2-Diisobutyl-1,3-dimethoxycyclohexane,
2-Isopropyl-2-isoamyl-1,3-dimethoxycyclohexane,
2-Cyclohexyl-2-methoxymethyl-1,3-dimethoxycyclohexane,
2-Isopropyl-2-methoxymethyl-1,3-dimethoxycyclohexane, 2-Isobutyl-2-methoxymethyl-1,3-dimethoxycyclohexane,
2-Cyclohexyl-2-ethoxymethyl-1,3-diethoxycyclohexane,
2-Cyclohexyl-2-ethoxymethyl-1,3-dimethoxycyclohexane,
2-Isopropyl-2-ethoxymethyl-1,3-diethoxycyclohexane,
2-Isopropyl-2-ethoxymethyl-1,3-dimethoxycyclohexane,
2-Isobutyl-2-ethoxymethyl-1,3-diethoxycyclohexane,
2-Isobutyl-2-ethoxymethyl-1,3-dimethoxycyclohexane,
Tris(p-methoxyphenyl)phosphine,
Methylphenylbis(methoxymethyl)silane,
Diphenylbis(methoxymethyl)silane,
Methylcyclohexylbis(methoxymethyl)silane,
Di-t-butylbis(methoxymethyl)silane,
Cyclohexyl-t-butylbis(methoxymethyl)silane, and
i-Propyl-t-butylbis(methoxymethyl)silane.

These compounds can be used in combination of two or more kinds.

Of the above compounds, preferably used are 1,3-diethers, and particularly preferably used are 2,2-diisobutyl-1,3-dimethoxypropane, 2-isopentyl-2-isopropyl-1,3-dimethoxypropane, 2,2-dicyclohexyl-1,3-dimethoxypropane, 2,2-bis(cyclohexylmethyl)-1,3-dimethoxypropane, 2-cyclohexyl-2-isopropyl-1,3-dimethoxypropane, 2-isopropyl-2-s-butyl-1,3-dimethoxypropane, 2,2-diphenyl-1,3-dimethoxypropane and 2-cyclopentyl-2-isopropyl-1,3-dimethoxypropane.

A combination of the organosilicon compound (C-1) and the polyether compound (C-2) can be used as the electron donor (C).

Further, another electron donor (b) can be used as the electron donor (C) together with the organosilicon compound (C-1) and/or the polyether compound (C-2).

As the electron donor (b), the aforesaid electron donor (a) used for preparing the solid titanium catalyst component (A), and the below-described nitrogen-containing compounds, oxygen-containing compounds and phosphorus-containing compounds are employable.

Examples of the nitrogen-containing compounds employable as the electron donor (b) include 2,6-substituted piperidines, 2,5-substituted piperidines, substituted methylenediamines such as N,N,N',N'-tetramethylmethylenediamine and N,N,N',N'-tetraethylmethylenediamine, and substituted imidazolidines such as 1,3-dibenzylimidazolidine and 1,3-dibenzyl-2-phenylimidazolidine.

Examples of the phosphorus-containing compounds include phosphites, such as triethyl phosphite, tri-n-propyl phosphite, triisopropyl phosphite, tri-n-butyl phosphite, triisobutyl phosphite, diethyl-n-butyl phosphite and diethylphenyl phosphite.

Examples of the oxygen-containing compounds include 2,6-substituted tetrahydropyrans and 2,5-substituted tetrahydropyrans.

(D) Transition metal compound

The transition metal compound (D) containing a ligand having cyclopentadienyl skeleton (sometimes referred to as "metallocene compound" hereinafter), that is used in the invention, is represented by the following formula (1):

$$ML_x \qquad (1)$$

wherein M is a transition metal selected from Group IVB of the periodic table, specifically, zirconium, titanium or hafnium, preferably zirconium; L is a ligand coordinated to the transition metal; at least one ligand L is a group having cyclopentadienyl skeleton; and x is a valence of the transition metal.

Examples of the groups having cyclopentadienyl skeleton include cyclopentadienyl group; alkyl substituted cyclopentadienyl groups, such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl and hexylcyclopentadienyl; indenyl group; 4,5,6,7-tetrahydroindenyl group; fluorenyl group; and substituted indenyl groups, such as 2-methyl-4-phenylindenyl and 2-methyl-4-isopropylindenyl.

These groups may be substituted with halogen atoms or trialkylsilyl groups.

Of the above groups, alkyl substituted cyclopentadienyl groups are particularly preferable.

When the compound represented by the formula (1) has two or more groups having cyclopentadienyl skeleton as the ligands L, two of them may be linked to each other through an alkylene group such as ethylene or propylene, a substituted alkylene group such as isopropylidene or diphenylmethylene, a silylene group, or a substituted silylene group such as dimethylsilylene, diphenylsilylene or methylphenylsilylene.

The ligand L other than the group having cyclopentadienyl skeleton is a hydrocarbon group of 1 to 12 carbon atom, an alkoxy group, an aryloxy group, a trialkylsilyl group, a $SO_3R$ group (R is a hydrocarbon group of 1 to 8 carbon atoms which may have a substituent such as halogen), a halogen atom or hydrogen.

Examples of the hydrocarbon groups of 1 to 12 carbon atoms include alkyl groups, such as methyl, ethyl, n-propyl, isopropyl, n-butyl, isobutyl, sec-butyl, t-butyl, pentyl, hexyl, octyl, 2-ethylhexyl and decyl; cycloalkyl groups, such as cyclopentyl and cyclohexyl; aryl groups, such as phenyl and tolyl; and aralkyl groups, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

Examples of the aryloxy groups include phenoxy.

Examples of the trialkylsilyl groups include trimethylsilyl, triethylsilyl and triphenylsilyl.

Examples of the halogen atoms include fluorine, chlorine, bromine and iodine.

Examples of the $SO_3R$ groups include p-toluenesulfonato, methanesulfonato and trifluoromethanesulfonato.

When the valence of the transition metal is 4, the metallocene compound (D) is more specifically represented by the following formula (2):

$$R^2{}_k R^3{}_l R^4{}_m R^5{}_n M \qquad (2)$$

wherein M is the same as that in the formula (1); $R^2$ is a group (ligand) having cyclopentadienyl skeleton; $R^3$, $R^4$ and $R^5$ are each a group having cyclopentadienyl skeleton or the same as the group shown as other ligand in the formula (1); k is an integer of not less than 1; and k+l+m+n=4.

Of the compounds represented by the formula (2), metallocene compounds in which at least one of $R^3$, $R^4$ and $R^5$ is a group having cyclopentadienyl skeleton, namely, metallocene compounds containing at least two groups having cyclopentadienyl skeleton, are preferably used in the invention. As described above, the two groups having cyclopentadienyl skeleton may be linked to each other through an alkylene group, a substituted alkylene group, a silylene group or a substituted silylene group.

Listed below are examples of the metallocene compounds (D).

Bis(cyclopentadienyl)zirconium dichloride,
Bis(methylcyclopentadienyl)zirconium dichloride,
Bis(ethylcyclopentadienyl)zirconium dichloride,
Bis(n-propylcyclopentadienyl)zirconium dichloride,
Bis(n-butylcyclopentadienyl)zirconium dichloride,
Bis(n-hexylcyclopentadienyl)zirconium dichloride,
Bis(methyl-n-propylcyclopentadienyl)zirconium dichloride,
Bis(methyl-n-butylcyclopentadienyl)zirconium dichloride,
Bis(dimethyl-n-butylcyclopentadienyl)zirconium dichloride,
Bis(n-butylcyclopentadienyl)zirconium dibromide,
Bis(n-butylcyclopentadienyl)zirconium methoxychloride,
Bis(n-butylcyclopentadienyl)zirconium ethoxychloride,
Bis(n-butylcyclopentadienyl)zirconium butoxychloride,
Bis(n-butylcyclopentadienyl)zirconium ethoxide,
Bis(n-butylcyclopentadienyl)zirconium methylchloride,
Bis(n-butylcyclopentadienyl)zirconium dimethyl,
Bis(n-butylcyclopentadienyl)zirconium benzylchloride,
Bis(n-butylcyclopentadienyl)zirconium dibenzyl,
Bis(n-butylcyclopentadienyl)zirconium phenylchloride,
Bis(n-butylcyclopentadienyl)zirconium hydride chloride,
Bis(indenyl)zirconium dichloride,
Bis(indenyl)zirconium dibromide,
Bis(indenyl)zirconium bis(p-toluenesulfonato),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethyl zirconium,
Ethylenebis(indenyl)diphenyl zirconium,
Ethylenebis(indenyl)methylzirconium monochloride,
Ethylenebis(indenyl)zirconium bis(methanesulfonato),
Ethylenebis(indenyl)zirconium bis(p-toluenesulfonato),
Ethylenebis(indenyl)zirconium bis(trifluoromethanesulfonato),
Ethylenebis(4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl)zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl)zirconium dichloride,
Dimethylsilylenebis(indenyl)zirconium dichloride,
Dimethylsilylenebis(indenyl)zirconium bis(trifluoromethanesulfonato),
Dimethylsilylenebis(4-phenyl-1-indenyl)zirconium dichloride,
Dimethylsilylenebis(2-methyl-4-phenyl-1-indenyl)zirconium dichloride,
Dimethylsilylenebis(2-methyl-4-(α-naphthyl)-1-indenyl)zirconium dichloride,
Dimethylsilylenebis(2-methyl-4-(β-naphthyl)-1-indenyl)zirconium dichloride,
Dimethylsilylenebis(2-methyl-4-(1-anthracenyl)-1-indenyl)zirconium dichloride,
Dimethylsilylenebis(2-methyl-benzindenyl)zirconium dichloride,
Dimethylsilylenebis(4,5,6,7-tetrahydroindenyl)zirconium dichloride,
Dimethylsilylene(cyclopentadienyl-fluorenyl)zirconium dichloride,
Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)ethylzirconium monochloride,
Bis(cyclopentadienyl)cyclohexylzirconium monochloride,
Bis(cyclopentadienyl)phenylzirconium monochloride,
Bis(cyclopentadienyl)benzylzirconium monochloride,
Bis(cyclopentadienyl)zirconium monochloride monohydride,
Bis(cyclopentadienyl)methylzirconium monohydride,
Bis(cyclopentadienyl)dimethyl zirconium,
Bis(cyclopentadienyl)diphenyl zirconium,
Bis(cyclopentadienyl)dibenzyl zirconium,
Bis(cyclopentadienyl)zirconium methoxychloride,
Bis(cyclopentadienyl)zirconium ethoxychloride,
Bis(cyclopentadienyl)zirconium bis(methanesulfonato),
Bis(cyclopentadienyl)zirconium bis(p-toluenesulfonato),
Bis(cyclopentadienyl)zirconium bis(trifluoromethanesulfonato),
Bis(methylcyclopentadienyl)zirconium dichloride,
Bis(dimethylcyclopentadienyl)zirconium dichloride,
Bis(dimethylcyclopentadienyl)zirconium ethoxychloride,
Bis(dimethylcyclopentadienyl)zirconium bis(trifluoromethanesulfonato),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium dichloride,
Bis(methylbutylcyclopentadienyl)zirconium bis(methanesulfonato),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride, and
Bis(trimethylsilylcyclopentadienyl)zirconium dichloride.

In the above-exemplified compounds, the di-substituted groups of the cyclopentadienyl rings include 1,2-position substituted and 1,3-position substituted groups, and the tri-substituted groups of the cyclopentadienyl groups include 1,2,3-position substituted and 1,2,4-position substituted groups.

The above-exemplified metallocene compounds are those wherein M is zirconium, but metallocene compounds wherein zirconium is replaced with titanium or hafnium in the above compounds are also employable.

Of the above compounds, preferably used are bis(n-propylcyclopentadienyl)zirconium dichloride, bis(n-butylcyclopentadienyl)zirconium dichloride, bis(1-methyl-3-n-propylcyclopentadienyl)zirconium dichloride and bis(1-n-butyl-3-methylcyclopentadienyl)zirconium dichloride.

In the present invention, a compound represented by the following formula (3) is also employable as the metallocene compound (D).

$$L^a MX_2 \tag{3}$$

wherein M is a metal of Group IV or the lanthanum series of the periodic table, $L^a$ is a derivative of delocalized π bond group and imparts restraint geometrical shape to the metal M active site, and X's are each independently hydrogen, a hydrocarbon group a silyl group or a germyl group containing 20 or less carbon atoms, silicon or germanium.

Of the compounds of the formula (3), preferable are those represented by the following formula (4):

wherein M is titanium or zirconium,

X is the same as described above,

Cp is a substituted cyclopentadienyl group having a substituent Z or its derivative bound in a π-bonding mode to M, Z is oxygen, sulfur, boron or an element of Group IVA of the periodic table, Y is a ligand containing nitrogen, phosphorus, oxygen or sulfur, and Z and Y may together form a fused ring system.

Listed below are examples of the compounds represented by the formula (4).

(Dimethyl(t-butylamide) (tetramethyl-$\eta^5$-cyclopentadienyl)silane)dibenzylzirconium, (Dimethyl(t-butylamide) (tetramethyl-$\eta^5$-cyclopentadienyl)silane)dibenzyltitanium, (Dimethyl(t-butylamide) (tetramethyl-$\eta^5$-cyclopentadienyl)silane)dimethyltitanium, ((t-Butylamide) (tetramethyl-$\eta^5$-cyclopentadienyl)-1,2-ethanediyl)dimethylzirconium, ((t-Butylamide) (tetramethyl-$\eta^5$-cyclopentadienyl)-1,2-ethanediyl)dibenzyltitanium, ((Methylamide) (tetramethyl-$\eta^5$-cyclopentadienyl)-1,2-ethanediyl)dibenzhydrylzirconium, ((Methylamide)(tetramethyl-$\eta^5$-cyclopentadienyl)-1,2-ethanediyl)dineopentyltitanium, ((Phenylphosphide) (tetramethyl-$\eta^5$-cyclopentadienyl)-methylene)diphenyltitanium, (Dibenzyl(t-butylamide) (tetramethyl-$\eta^5$-cyclopentadienyl)silane)dibenzylzirconium, (Dimethyl(benzylamide) ($\eta^5$-cyclopentadienyl)silane)di(trimethylsilyl)titanium, (Dimethyl(phenylphosphide)-(tetramethyl-$\eta^5$-cyclopentadienyl)silane)dibenzylzirconium, (Dimethyl(t-butylamide) (tetramethyl-$\eta^5$-cyclopentadienyl)silane)dibenzylhafnium, (Tetramethyl-$\eta^5$-cyclopentadienyl)-1,2-ethanediyl) dibenzyltitanium, (2-$\eta^5$-(Tetramethyl-cyclopentadienyl)-1-methyl-ethanolate(2-))dibenzyltitanium, (2-$\eta^5$-(Tetramethyl-cyclopentadienyl)-1-methyl-ethanolate(2-))dibenzylzirconium, (2-$\eta^5$-(Tetramethyl-cyclopentadienyl)-1-methyl-ethanolate(2-))dimethylzirconium, (2-((4a,4b,8a,9,9a-$\eta$)-9H-Fluorene-9-yl)cyclohexanolate (2-))dimethyltitanium, (2-((4a,4b,8a,9,9a-$\eta$)-9H-Fluorene-9-yl)cyclohexanolate (2-))dimethylzirconium, and (2-((4a,4b,8a,9,9a-$\eta$)-9H-Fluorene-9-yl)cyclohexanolate (2-))dibenzylzirconium.

In the present invention, the metallocene compounds (D) mentioned above can be used in combination of two or more kinds.

(E) Catalyst components

The catalyst component (E) includes (E-1) an organoaluminum oxy-compound and (E-2) Lewis acid or an ionic compound.

In the present invention, the organoaluminum oxy-compound (E-1) or the Lewis acid or ionic compound (E-2) is employable as the catalyst component (E), but the components (E-1) and (E-2) may be used in combination.

(E-1) Organoaluminum oxy-compound

The organoaluminum oxy-compound (E-1) used in the invention may be aluminoxane conventionally known or a benzene-insoluble organoaluminum oxy-compound exemplified in Japanese Patent Laid-Open Publication No. 78687/1990.

The conventionally known aluminoxane can be prepared by, for example, the following procedures.

(1) An organoaluminum compound such as trialkylaluminum is added to a hydrocarbon medium suspension of compounds containing adsorbed water or salts containing water of crystallization, e.g., magnesium chloride hydrate, copper sulfate hydrate, aluminum sulfate hydrate, nickel sulfate hydrate or cerous chloride hydrate, so as to cause the organoaluminum compound to react with the adsorbed water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is caused to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and the remainder is redissolved in a solvent or suspended in a poor solvent of aluminoxane.

Examples of the organoaluminum compounds used for preparing the aluminoxane include:

trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, preferable are trialkylaluminums and tricycloalkylaluminums. Particularly preferable is trimethylaluminum.

Also employable as the organoaluminum compound used for preparing the aluminoxane is isoprenylaluminum represented by the formula $(i\text{-}C_4H_9)_xAl_y(C_5H_{10})_z$ (wherein x, y, z are each a positive number, and $z \geq 2x$).

The organoaluminum compounds mentioned above are used singly or in combination.

Examples of the solvents used in a solution or suspension of the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halides of these aromatic, aliphatic and alicyclic hydrocarbons, particularly chlorides and bromides thereof. Also employable are ethers such as ethyl ether and tetrahydrofuran. Of the solvents, particularly preferable are aromatic hydrocarbons and aliphatic hydrocarbons.

The benzene-insoluble organoaluminum oxy-compound employable in the invention contains an Al component, that is soluble in benzene at 60° C., in an amount of usually not more than 10% (in terms of Al atom), preferably not more than 5%, particularly preferably not more than 2%, and this organoaluminum oxy-compound is insoluble or slightly soluble in benzene.

(E-2) Lewis acid or ionic compound

Examples of the Lewis acid or ionic compound (E-2) include Lewis acid, ionic compounds and carborane compounds described in National Publications of International Patent No. 501950/1989 (corresponds to, for example, EP-277003-A) and No. 502036/1989 (see, CA1337142-C), Japanese Patent Laid-Open Publications No. 179005/1991 (see, CA2027145-A), No. 179006/1991 (see, CA2027144-A), No. 207703/1991 (see, CA2027123-A) and No. 207704/1991 (see, CA2027122-A), and U.S. patent application Ser. No. 547,718 (now, U.S. Pat. No. 5,321,106).

The Lewis acid is, for example, a compound represented by the formula $BR_3$ (R is a phenyl group which may have a substituent such as fluorine, methyl or trifluoromethyl, or fluorine). Examples of such compounds include trifluoroboron, triphenylboron, tris(4-fluorophenyl)boron, tris(3,5-difluorophenyl)boron, tris(4-fluoromethylphenyl) boron, tris(pentafluorophenyl)boron, tris(p-tolyl)boron, tris (o-tolyl)boron and tris(3,5-dimethylphenyl)boron.

Examples of the ionic compounds include trialkyl-substituted ammonium salts, N,N-dialkylanilinium salts, dialkylammonium salts and triarylphosphonium salts. More specifically, there can be mentioned:

trialkyl-substituted ammonium salts, such as triethylammoniumtetra(phenyl)boron, tripropylammoniumtetra(phenyl)boron, tri(n-butyl) ammoniumtetra(phenyl)boron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl)boron and tri(n-butyl)ammoniumtetra(o-tolyl)boron;

N,N,-dialkylanilinium salts, such as N,N-dimethylaniliniumtetra(phenyl)boron, N,N-diethylaniliniumtetra(phenyl)boron and N,N-2,4,6-pentamethylaniliniumtetra(phenyl)boron; and dialkylammonium salts, such as di(1-propyl) ammoniumtetra(pentafluorophenyl)boron and dicyclohexylammoniumtetra(phenyl)boron.

Triphenylcarbeniumtetrakis(pentafluorophenyl)borate, N,N-dimethylaniliniumtetrakis(pentafluorophenyl)borate and ferroceniumtetrakis(pentafluorophenyl)borate are also employable as the ionic compounds.

Further, the following compounds are also employable as the ionic compounds.

Salts of anions, such as:

bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorodecaborate, bis[tri(n-butyl)ammonium]dodecachlorododecaborate, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, and tri(n-butyl)ammoniumbromo-1-carbadodecaborate.

In the ionic compounds exemplified above, the counter ion is tri(n-butyl)ammonium, but the counter ion is in no way limited thereto.

Borane compounds, carborane complex compounds and salts of carborane anions, such as:

decaborane(14), 7,8-dicarbaundecaborane(13), 2,7-dicarbaundecaborane(13), undecahydride-7,8-dimethyl-7,8-dicarbaundecaborane, dodecahydride-11-methyl-2,7-dicarbaundecaborane, tri(n-butyl) ammonium-6-carbadecaborate(14), tri(n-butyl)ammonium-6-carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl)ammoniumdodecahydride-8-methyl-7,9-dicarbaundecaborate, tri(n-butyl) ammoniumundecahydride-8-ethyl-7,9-dicarbaundecaborate, tri(n-butyl)ammoniumundecahydride-8-butyl-7,9-dicarbaundecaborate, tri(n-butyl)ammoniumundecahydride-8-allyl-7,9-dicarbaundecaborate, tri(n-butyl)ammoniumundecahydride-9-trimethylsilyl-7,8-dicarbaundecaborate, and tri(n-butyl)ammoniumundecahydride-4,6-dibromo-7-carbaundecaborate.

Carborane compounds and salts of carboranes, such as:

4-carbanonaborane(14), 1,3-dicarbanonaborane(13), 6,9-dicarbadecaborane(14), dodecahydride-1-phenyl-1,3-dicarbanonaborane, dodecahydride-1-methyl-1,3-dicarbanonaborane, and undecahydride-1,3-dimethyl-1,3-dicarbanonaborane.

Salts of metallic carboranes and metallic borane anions, such as:

tri(n-butyl)ammoniumbis(nonahydride-1,3-dicarbanonaborate)cobaltate(III), tri(n-butyl)ammoniumbis(undecahydride-7,8-dicarbaundecaborate)ferrate(III), tri(n-butyl)ammoniumbis(undecahydride-7,8-dicarbaundecaborate)cobaltate(III), tri(n-butyl)ammoniumbis(undecahydride-7,8-dicarbaundecaborate)nickelate(III), tri(n-butyl)ammoniumbis(undecahydride-7,8-dicarbaundecaborate)cuprate(III), tri(n-butyl)ammoniumbis(undecahydride-7,8-dicarbaundecaborate)aurate(III), tri(n-butyl)ammoniumbis(nonahydride-7,8-dimethyl-7,8-dicarbaundecaborate)ferrate(III), tri(n-butyl)ammoniumbis(nonahydride-7,8-dimethyl-7,8-dicarbaundecaborate)chromate(III), tri(n-butyl)ammoniumbis(tribromooctahydride-7,8-dicarbaundecaborate)cobaltate(III), tri(n-butyl)ammoniumbis(dodecahydridedodecaborate)cobaltate(III), bis[tri(n-butyl)ammonium]bis(dodecahydride-dodecaborate)nickelate(III), tris[tri(n-butyl)ammonium]bis(undecahydride-7-carbaundecaborate)chromate(III), bis[tri(n-butyl)ammonium]bis(undecahydride-7-carbaundecaborate)manganate(IV), bis[tri(n-butyl)ammonium]bis(undecahydride-7-carbaundecaborate)cobaltate(III), and bis[tri(n-butyl)ammonium]bis(undecahydride-7-carbaundecaborate)nickelate(IV).

The compounds (E-2) mentioned above may be used in combination of two or more kinds.

Process for preparing olefin polymer

In the processes for preparing an olefin polymer according to the present invention, an olefin polymer composed of a propylene block copolymer component and an ethylene/α-olefin copolymer component is prepared by polymerization. In the processes, a propylene block copolymer component is first formed using an olefin polymerization catalyst, and then another catalyst component is added to form a low-crystalline or non-crystalline ethylene/α-olefin copolymer component, whereby an olefin polymer is prepared.

The propylene block copolymer component can be formed by conducting (i) a step of forming a crystalline polypropylene component using an olefin polymerization catalyst (or a later-described prepolymerized catalyst) and (ii) a step of forming a low-crystalline or non-crystalline ethylene/α-olefin copolymer component in an arbitrary order. More specifically, the propylene block copolymer component can be prepared by conducting a step (i) of homopolymerizing propylene or copolymerizing propylene and an α-olefin other than propylene to form a crystalline polypropylene component and a step (ii) of copolymerizing ethylene and an α-olefin to form a low-crystalline or non-crystalline ethylene/α-olefin copolymer component, in this order.

The propylene block copolymer component can be prepared also by conducting a step (ii) of copolymerizing ethylene and an α-olefin to form a low-crystalline or non-crystalline ethylene/α-olefin copolymer component and a step (i) of homopolymerizing propylene or copolymerizing propylene and an α-olefin other than propylene to form a crystalline polypropylene component, in this order.

In the present invention, the propylene block copolymer component is preferably prepared by first (i) forming a crystalline polypropylene component and then (ii) forming a low-crystalline or non-crystalline ethylene/α-olefin copolymer component. The processes in which those steps (i) and (ii) are conducted in this order will be mainly described hereinafter.

First process for preparing olefin polymer

In the first process for preparing an olefin polymer according to the invention, (i) a step of homopolymerizing propylene or copolymerizing propylene and an α-olefin other than propylene using an olefin polymerization catalyst (1) to form a crystalline polypropylene component and (ii) a step of copolymerizing ethylene and an α-olefin of 3 to 20 carbon atoms using the olefin polymerization catalyst (1) to form a low-crystalline or non-crystalline ethylene/α-olefin copolymer component are conducted in an arbitrary order to form a propylene block copolymer component;

then an olefin polymerization catalyst (2) is added to the polymerization system; and (iii) ethylene is copolymerized with an α-olefin to form a low-crystalline or non-crystalline ethylene/α-olefin copolymer component, whereby an olefin polymer is prepared.

The olefin polymerization catalyst (1) used for forming the propylene block copolymer component is formed from:

(A) the solid titanium catalyst, (B) the organometallic compound, and optionally (C) the electron donor.

In the present invention, a prepolymerized catalyst obtained by prepolymerizing an olefin of two or more carbon atoms in the presence of the above catalyst components for forming the olefin polymerization catalyst (1) is also employable.

Examples of the olefins of two or more carbon atoms used for the prepolymerization include:

linear α-olefins, such as ethylene, propylene, 1-butene, 1-pentene, 1-hexene, 1-octene, 1-decene, 1-dodecene, 1-tetradecene, 1-hexadecene, 1-octadecene and 1-eicosene; and cycloolefins, such as cyclopentene, cycloheptene, norbornene, 5-ethyl-2-norbornene, tetracyclododecene and 2-ethyl-1,4,5,8-dimethano-1,2,3,4,4a,5,8,8a-octahydronaphthalene.

Also employable are olefins represented by the following formulas (i) and (ii):

wherein X is an cycloalkyl group; an aryl group or

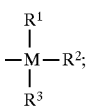

M is carbon or silicon; $R^1$ and $R^2$ are each a hydrocarbon group; and $R^3$ is hydrogen or a hydrocarbon group.

Examples of the cycloalkyl groups indicated by X include cyclopentyl, cyclohexyl and cycloheptyl. Examples of the aryl groups include phenyl, tolyl, xylyl and naphthyl.

Examples of the hydrocarbon groups indicated by $R^1$, $R^2$ and $R^3$ include alkyl groups, such as methyl, ethyl propyl and butyl; aryl groups, such as phenyl and naphthyl; and norbornyl groups. The hydrocarbon groups indicated by $R^1$, $R^2$ and $R^3$ may contain silicon or halogen.

Examples of the compounds represented by the formulas (i) and (ii) include:

branched α-olefins, such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene and 3-ethyl-1-hexene; and vinyl compounds, such as allylnaphthalene, allylnorbornane, styrene, dimethylstyrenes, vinylnaphthalenes, allyltoluenes, allylbenzene, vinylcyclohexane, vinylcyclopentane, vinylcycloheptane and allyltrialkylsilanes.

Of these, propylene, 1-butene, 1-pentene, 3-methyl-1-butene, 3-methyl-1-pentene, 3-ethyl-1-hexene, vinylcyclohexane, allyltrimethylsilane and dimethylstyrene are preferable. Among them, propylene, 3-methyl-1-butene, vinylcyclohexane and allyltrimethylsilane are more preferable.

These olefins may be prepolymerized in combination of two or more kinds.

In the present invention, it is desirable that the olefin is prepolymerized in an amount of 0.01 to 2,000 g, preferably 0.1 to 200 g, based on 1 g of the solid titanium catalyst component (A), to thereby form a prepolymerized catalyst.

The concentration of the solid titanium catalyst component (A) in the prepolymerization system is desired to be in the range of usually about 0.01 to 200 mmol, preferably about 0.05 to 100 mmol, based on 1 liter of the polymerization solution.

The organometallic compound catalyst component (B) can be used in an amount of usually 0.01 to 100 mol, preferably 0.5 to 50 mol, based on 1 mol of the titanium atom in the solid titanium catalyst component (A). The electron donor (C) can be used in an amount of usually 0.1 to 50 mol, preferably 0.5 to 30 mol, more preferably 1 to 10 mol, based on 1 mol of the titanium atom.

The prepolymerization can be carried out using the above-mentioned olefin and catalyst components under mild reaction conditions in the presence of a hydrocarbon medium which is inert to polymerization.

Examples of the hydrocarbon media used herein include aliphatic hydrocarbons, such as propane, butane, isobutane, pentane, hexane, heptane, octane, decane, dodecane, hexadecane and octadecane; alicyclic hydrocarbons, such as cyclopentane, cyclohexane, methylcyclopentane and cyclooctane; aromatic hydrocarbons, such as benzene, toluene and xylene; petroleum fractions, such as gasoline, kerosine and gas oil; halogenated hydrocarbons, such as ethylene chloride and chlorobenzene; and mixtures of these hydrocarbon media. Of these, aliphatic hydrocarbons are particularly preferable.

The reaction temperature in the prepolymerization is preferably such a temperature that the resulting prepolymer is not substantially dissolved in the inert hydrocarbon medium, and the temperature is in the range of usually −20° to +100° C., preferably about −20° to +80° C., more preferably 0° to +40° C.

A molecular weight modifier such as hydrogen can be employed in the prepolymerization.

Further, compounds useful for forming the prepolymerized catalyst are employable in addition to the above components.

The prepolymerization may be carried out by any of batchwise, semi-continuous and continuous processes.

(i) Formation of crystalline polypropylene component

In a preferred embodiment of the invention, first, (i) a crystalline polypropylene components is formed by homopolymerizing propylene or copolymerizing propylene and other α-olefin in the presence of the olefin polymerization catalyst (1) (or prepolymerized catalyst).

In the step (i) for forming the crystalline poly-α-olefin component, propylene is homopolymerized or copolymerized with other α-olefin in the presence of the olefin polymerization catalyst (1) (or prepolymerized catalyst).

Examples of the other α-olefins include ethylene and α-olefins of 4 to 10 carbon atoms such as 1-butene, 1-pentene, 1-hexene, 1-octene, 1-decene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene and 3-ethyl-1-hexene.

Further, olefins other than the α-olefins shown as the prepolymerizable olefins or diene compounds shown in the later-described ethylene/α-olefin copolymerization step (ii) can be employed in small amounts, as far as not prejudicial to the objects of the present invention. They can be used in combination or two or more kinds.

The olefin other than propylene can be used in such an amount that the units derived therefrom are finally present in the polypropylene component in amounts of not more than 5% by mol, preferably not more than 4% by mol.

In the present invention, it is preferable that propylene is homopolymerized in the step (i) to form the crystalline polypropylene component.

This step (i) can be carried out in two or more stages under different reaction conditions.

In the step (i) for forming the crystalline polypropylene component, the solid titanium catalyst component (A) or the prepolymerized catalyst is desirably used in an amount of about 0.0001 to 50 mmol, preferably about 0.001 to 10 mmol, in terms of titanium atom, based on 1 liter of the polymerization volume.

The organometallic compound (B) can be used in an amount of 1 to 2,000 mol, preferably 2 to 1,000 mol, based on 1 mol of the titanium atom in the solid titanium catalyst component (A). The electron donor (C) can be used, according to necessity, in an amount of 0.001 to 5,000 mol, preferably 0.05 to 1,000 mol, based on 1 mol of the titanium atom.

When the prepolymerized catalyst is used in the polymerization stage, the organometallic compound (B) and the electron donor (C) are arbitrary components, and they may be used or may not be used. If they are used, they can be added in the above-mentioned amounts based on the concentration of the titanium atom in the polymerization system.

The electron donor (C), which is optionally used in the polymerization, may be the same as or different from the electron donor (C) used for forming the prepolymerized catalyst.

The step (i) can be carried out by a solvent suspension polymerization process, a suspension polymerization process using liquid propylene as a solvent, a gas phase polymerization process, or the like, and it can be carried out by any of batchwise, semi-continuous and continuous processes.

In the solvent suspension polymerization process, a hydrocarbon that is inert to polymerization is employable as the polymerization solvent. Examples of the inert hydrocarbons are the same as those described above in the prepolymerization, and aliphatic hydrocarbons are preferably used.

The polymerization of propylene is carried out at a temperature of usually about −50° to 200° C., preferably about 50° to 100° C., under a pressure of atmospheric pressure to 100 kg/cm$^2$, preferably about 2 to 50 kg/cm$^2$.

In the step (i), the molecular weight of the resulting polypropylene can be modified by the use of hydrogen (chain transfer agent).

In the present invention, the crystalline polypropylene component is formed as described above, and then a low-crystalline or non-crystalline ethylene/α-olefin copolymer component is formed by copolymerizing ethylene and an α-olefin without performing deactivation treatment of the catalyst used for forming the polypropylene component, whereby a propylene block copolymer component is prepared.

(ii) Formation of ethylene/α-olefin copolymer component

In the step (ii) for forming the low-crystalline or non-crystalline ethylene/α-olefin copolymer component, propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene, etc. are employable as the α-olefins of 3 to 20 carbon atoms used for the copolymerization with ethylene. These α-olefins can be used in combination of two or more kinds. Of these, propylene, 1-butene, 1-octene, 1-pentene, 1-hexane and 4-methyl-1-pentene are preferable.

It is desirable that ethylene and the α-olefin are used in a molar ratio of 1 : 0.01 to 200, preferably 1: 0.05 to 50.

In the step (ii) of copolymerization of ethylene and the α-olefin, olefins other than the α-olefins shown in the propylene polymerization step (i) or the following diene compounds are also employable in small amounts, as far as not prejudicial to the objects of the present invention.

Examples of the diene compounds include 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, 1,7-octadiene, 1,9-decadiene, isoprene, butadiene, ethylidene norbornene, vinyl norbornene and dicyclopentadiene. These diene compounds can be used in combination of two or more kinds.

In the ethylene/α-olefin copolymerization system, the polypropylene component is used in an amount of 10 to 1,000 g, preferably 10 to 800 g, particularly preferably 30 to 500 g, based on 1 liter of the polymerization volume. It is desirable that the amount of polypropylene corresponds to usually 0.0001 to 1 mmol, preferably about 0.001 to 0.5 mmol, in terms of titanium atom of the solid catalyst component (A) contained in the polypropylene, based on 1 liter of the polymerization volume.

In the present invention, the catalyst components can be further added to the system of the ethylene/α-olefin copolymerization that is conducted in the presence of the polypropylene component containing the olefin polymerization catalyst (1). When the catalyst components are added, the solid titanium catalyst component (A) can be used in an amount of 0.0001 to 20 mmol, preferably 0.001 to 20 mmol, based on 1 liter of the polymerization volume; the electron donor (C) can be used in an amount of 0.001 to 5,000 mol, preferably 0.01 to 1,000 mol, based on 1 mol of the titanium atom in the polymerization system; and the organometallic compound (B) can be used in an amount of 1 to 2,000 mol, preferably about 2 to 1,000 mol, based on 1 mol of the titanium atom in the polymerization volume.

The copolymerization of ethylene and the α-olefin may be carried out by a gas phase process or a liquid phase process, and it can be carried out by any of batchwise, semicontinuous and continuous processes. The copolymerization may be performed in two or more stages under different reaction conditions.

When the copolymerization step (ii) is conducted by a solvent suspension polymerization process, the aforesaid inert hydrocarbon is employable as the polymerization solvent.

The step (ii) of copolymerization of ethylene and the α-olefin is carried out at a temperature of usually about −50° to 200° C., preferably about 20° to 100° C., under a pressure of atmospheric pressure to 100 kg/cm$^2$, preferably about 2 to 50 kg/cm$^2$.

In the copolymerization, hydrogen (chain transfer agent) can be optionally added to modify a molecular weight of the resulting copolymer.

If the propylene block copolymer component is prepared using the aforementioned prepolymerized catalyst, the units derived from olefin formed by the prepolymerization (prepolymer) are desirably contained in the finally obtained propylene block copolymer component in amounts of 0.001 to 3% by weight, preferably 0.005 to 2% by weight.

In the step for preparing a propylene block copolymer component, a propylene block copolymer component containing a highly stereoregular polypropylene component can be obtained.

(iii) Formation of ethylene/α-olefin copolymer component

In the first process for preparing an olefin polymer according to the invention, the propylene block copolymer component is formed using the olefin polymerization catalyst (1) as described above, then (iii) ethylene is copolymerized with the α-olefin of 3 to 20 carbon atoms to form an ethylene/α-olefin copolymer component, and prior to the copolymerization, an olefin polymerization catalyst (2) is added to the system of copolymerization of ethylene and the α-olefin.

The olefin polymerization catalyst (2) used in the invention is formed from:

(D) the transition metal compound containing a ligand having cyclopentadienyl skeleton (metallocene compound), and (E) (E-1) the organoaluminum oxy-compound and/or (E-2) the Lewis acid or ionic compound (sometimes referred to as "catalyst component (E)" hereinafter).

For preparing the olefin polymerization catalyst (2), an organoaluminum compound, a carrier, etc. can be also used, according to necessity, in addition to the metallocene compound (D) and the catalyst component (E).

Examples of the organoaluminum compounds used herein include those shown as the organoaluminum compounds (B) used for forming the olefin polymerization catalyst (1).

The carrier used herein is an inorganic or organic, granular or particulate solid having a particle diameter of 10 to 300 μm, preferably 20 to 200 μm. The inorganic carrier is preferably a porous oxide, and examples thereof include $SiO_2$, $Al_2O_3$, $MgO$, $ZrO_2$, $TiO_2$, $B_2O_3$, $CaO$, $ZnO$, $BaO$, $ThO_2$ and mixtures thereof such as $SiO_2$—$MgO$, $SiO_2$—$Al_2O_3$, $SiO_2$—$TiO_2$, $SiO_2$—$V_2O_5$, $SiO_2$—$Cr_2O_3$ and $SiO_2$—$TiO_2$—$MgO$. Of these, porous oxides containing $SiO_2$ and/or $Al_2O_3$ as their major component are preferable.

The inorganic oxides may contain carbonates, sulfates, nitrates and oxides, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, and $Li_2O$, in small amounts.

The properties of the carriers vary depending on the kind thereof and the process for the preparation thereof, but it is desired that the specific surface area is in the range of 50 to 1,000 $m^2/g$, preferably 100 to 700 $m^2/g$, and the pore volume is in the range of 0.3 to 2.5 $cm^3/g$. If desired, the carrier is calcined at a temperature of 100° to 1,000° C., preferably 150° to 700° C., prior to use.

The organic carrier is, for example, a granular or particulate solid organic compound having a particle diameter of 10 to 300 µm. Examples of such organic compounds include (co)polymers produced using, as their main component, an α-olefin of 2 to 14 carbon atoms such as ethylene, propylene, 1-butene or 4-methyl-1-pentene, and (co) polymers produced using, as their main component, vinylcyclohexane or styrene.

In the present invention, an olefin polymerization catalyst (2) of carrier support type, which is obtained by the use of the above-mentioned carrier together with the metallocene compound (D) and the catalyst component (E), is preferably employed.

When the olefin polymerization catalyst (2) is prepared from the above components, the components may be contacted in an arbitrary order, but preferably the carrier is contacted first with the catalyst component (E), then with metallocene compound (D) and then, if necessary, with the organoaluminum compound.

The contact of the above components can be carried out in a hydrocarbon solvent which is inert to those components.

For preparing the olefin polymerization catalyst (2) using the carrier, it is desirable to form a catalyst in which the metallocene compound (D) is supported in an amount (in terms of transition metal atom derived from the metallocene compound (D)) of $5 \times 10^{-6}$ to $5 \times 10^{-4}$ g.atom, preferably $1 \times 10^{-5}$ to $2 \times 10^{-4}$ g.atom, based on 1 g of the carrier.

The amount of aluminum (total amount of aluminum in the component (E-1) and aluminum in the organoaluminum compound) per 1 g of the carrier is desirably in the range of $10^{-3}$ to $5 \times 10^{-2}$ g.atom, preferably $2 \times 10^{-3}$ to $2 \times 10^{-2}$ g.atom.

The carrier support type catalyst can be prepared by contacting the above components at a temperature of usually −50° to 150° C., preferably −20° to 120° C., for 1 minute to 50 hours, preferably 10 minutes to 25 hours.

As the olefin polymerization catalyst (2), a prepolymerized catalyst obtained by prepolymerizing an olefin in the presence of the above catalyst components is employable in the invention.

The prepolymerization can be carried out in the same manner as that for the olefin polymerization catalyst (1), except for varying the catalyst components.

Examples of the olefins employable in the prepolymerization include those used in the prepolymerization for the olefin polymerization catalyst (1). Of these, those used for the polymerization stage, e.g., ethylene and α-olefins, are preferable.

In the prepolymerization, it is desired that the olefin is prepolymerized in an amount of 1 to 100,000 g, preferably 2 to 50,000 g, based on 1 g of the metallocene compound (D), to thereby form a prepolymerized catalyst.

The concentration of the metallocene compound in the prepolymerization system is desirably in the range of usually $1 \times 10^{-6}$ to $2 \times 10^{-2}$ mol, preferably $5 \times 10^{-5}$ to $10^{-2}$ mol, based on 1 liter of the polymerization volume.

The component (E) is desirably used in such an amount that the atomic ratio of aluminum or boron in the component (E) to the transition metal in the metallocene compound (E) (Al or B/transition metal) becomes usually 10 to 500, preferably 20 to 200.

The carrier is used in the above-mentioned amount according to necessity. The organoaluminum compound is used, according to necessity, in such an amount that the atomic ratio of aluminum in the organoaluminum compound to aluminum or boron in the component (E) (Al/Al or B) becomes usually 0.02 to 3, preferably 0.05 to 1.5.

The prepolymerization can be carried out at a temperature of −20° to 80° C., preferably 0° to 60° C., for 0.5 to 100 hours, preferably 1 to 50 hours.

The prepolymerization can be carried out by, for example, introducing an olefin into a hydrocarbon solvent that is inert to polymerization in the presence of the catalyst components. When the carrier support type catalyst is used, the prepolymerization can be carried out in the following manner.

To a hydrocarbon suspension of a carrier, the component (E) is added, and they are reacted for a predetermined period of time. Then, a supernatant liquid is removed, and the resulting solid is resuspended in a hydrocarbon. To the system, the metallocene compound (E) is added to perform reaction for a predetermined period of time. Then, a supernatant liquid is removed to obtain a solid catalyst component, which is then added to a hydrocarbon containing an organoaluminum compound. To the system, an olefin is introduced to perform polymerization, whereby a prepolymerized catalyst is obtained.

The prepolymerization can be carried out by any of batchwise and continuous processes, and it can be conducted at reduced or ordinary pressure or under pressure. In the prepolymerization, a molecular weight modifier such as hydrogen can be employed.

In the present invention, the olefin polymerization catalyst (2) mentioned above is added to the polymerization system, and ethylene and an α-olefin or 3 to 20 carbon atoms are copolymerized to form a low-crystalline or non-crystalline ethylene/α-olefin copolymer component (iii).

Examples of the α-olefins of 3 to 20 carbon atoms to be copolymerized with ethylene include those shown in the aforesaid ethylene/α-olefin copolymerization step (ii), and they can be used in combination of two or more kinds. Among them, 1-butene, 1-octene, 1-pentene, 1-hexene and 4-ethyl-1-pentene are preferably used.

The α-olefin used herein may be the same as or different from that used in the copolymerization step (ii).

For forming the ethylene/α-olefin copolymer component (iii), it is desired that ethylene and the α-olefin are used in a molar ratio of 1 : 0.01 to 200, preferably 1: 0.05 to 50.

The copolymerization of ethylene and the α-olefin can be carried out by any of a gas phase polymerization process and a liquid phase polymerization process such as suspension polymerization process or solution polymerization process, and it can be conducted by any of batchwise, semi-continuous and continuous processes.

In the suspension polymerization, a hydrocarbon that is inert to polymerization may be used as a solvent, or the olefin itself may be used as a solvent. Examples of the hydrocarbons employable herein include the aforesaid inert hydrocarbons shown in the prepolymerization for the olefin polymerization catalyst (1). Of these, aliphatic hydrocarbons, alicyclic hydrocarbons and petroleum fractions are preferable.

When the compound of the formula (3) is used as the metallocene compound (D) that is added to the ethylene/α-olefin copolymerization system, it is preferred to effect a gas phase polymerization process. When the compound of the formula (4) is used, it is preferred to effect a solution polymerization process.

In the polymerization system, the metallocene compound (D) or the prepolymerized catalyst is desirably used in an amount of about $1 \times 10^{-8}$ to $1 \times 10^{-3}$ g.atom, preferably $1 \times 10^{-7}$ to $1 \times 10^{-4}$ g.atom, in terms of the transition metal atom, based on 1 liter of the polymerization volume. The catalyst component (E) is used in such an amount that the atomic ratio of aluminum or boron in the catalyst component (E) to the transition metal in the metallocene compound (D) (Al or B/transition metal) becomes usually 10 to 500, preferably 20 to 200. The olefin polymerization catalyst (2) preferably is a carrier support type catalyst, as described above.

If the prepolymerized catalyst is used in the copolymerization of ethylene and the α-olefin, the catalyst component (E) is an arbitrary component, and it may be used or may not be used. When the catalyst component (E) is used, it can be added in a ratio thereof to the transition metal in the polymerization system of 10 to 500, preferably 20 to 200.

The organoaluminum compound can be added, according to necessity, in such an amount that the atomic ratio of aluminum in the organoaluminum compound to aluminum or boron in the catalyst component (E) (Al/Al or B) becomes usually 0.02 to 3, preferably 0.05 to 1.5.

In a liquid phase polymerization process, the copolymerization of ethylene and the α-olefin is desirably carried out at a temperature of usually −50° to 150° C., preferably 0° to 120° C., and in a gas phase polymerization process, it is desirably carried out at a temperature of usually 0° to 120° C., preferably 20° to 100° C.

The copolymerization is conducted at a pressure of atmospheric pressure to 100 kg/cm$^2$, preferably 2 to 50 kg/cm$^2$.

When ethylene and the α-olefin are copolymerized in the presence of the olefin polymerization catalyst (2) as described above, an ethylene/α-olefin copolymer component (iii) having a narrow composition distribution can be obtained.

Second process for preparing olefin polymer

In the second process for preparing an olefin polymer according to the invention, (i) a step of homopolymerizing propylene or copolymerizing propylene and an α-olefin other than propylene using an olefin polymerization catalyst (3) or (4) to prepare a crystalline polypropylene component and (ii) a step of copolymerizing ethylene and an α-olefin of 3 to 20 carbon atoms using the olefin polymerization catalyst (3) or (4) to prepare a low-crystalline or non-crystalline ethylene/α-olefin copolymer component are conducted in an arbitrary order to form a propylene block copolymer component;

then (E) (E-1) an organoaluminum oxy-compound and/or (E-2) Lewis acid or an ionic compound is added to the polymerization system; and (iii) ethylene is copolymerized with an α-olefin to form a low-crystalline or non-crystalline ethylene/α-olefin copolymer component.

The olefin polymerization catalyst (3) used in the invention is formed from:

[I-1] a solid transition metal catalyst component comprising (A) the solid titanium catalyst component, and supported thereon, (D) the transition metal compound containing a ligand having cyclopentadienyl skeleton, (B) the organometallic compound, and optionally (C) the electron donor.

The olefin polymerization catalyst (4) used in the invention is formed from:

[I-2] a solid transition metal catalyst component comprising (D-1) a solid catalyst component comprising a transition metal compound containing a ligand having cyclopentadienyl skeleton, and supported thereon, (A-1) a titanium catalyst component containing magnesium, titanium, halogen and an electron donor, (B) the organometallic compound, and optionally (C) the electron donor.

The organoaluminum compounds for forming the olefin polymerization catalysts (3) and (4) used in the second process for preparing an olefin polymer do not include aluminoxanes.

The solid transition metal catalyst component [I-1] or [I-2] for forming the olefin polymerization catalyst (3) or (4) used in the second process for preparing an olefin polymer is prepared in the following manner using the aforementioned components (A), (B) and (D), and optionally, the component (C).

[I-1] Solid transition metal catalyst component

In order to form the solid transition metal catalyst component [I-1] by causing the solid titanium catalyst component (A) to support thereon the metallocene compound (D), the following processes can be utilized.

(1) The solid titanium catalyst component (A) is contacted with the metallocene compound (D) in a hydrocarbon solvent.

(2) From a suspension obtained by the process (1), the hydrocarbon solvent is evaporated.

(3) The solid titanium catalyst component (A) and the metallocene compound (D) are co-pulverized.

(4) The process (3) is carried out in the presence of a hydrocarbon solvent or a halogenated hydrocarbon solvent.

Of the above processes, the processes (1) and (2) are preferable.

More specifically, in the contact of the solid titanium catalyst component (A) with the metallocene compound (D) in a hydrocarbon solvent, the solid titanium catalyst component (A) is desirably used in an amount of 0.1 to 200 mg.atom/liter-hydrocarbon solvent, preferably 1 to 50 mg.atom/liter, in terms of the titanium atom. The metallocene compound (D) is desirably used in an amount of 0.1 to 50 mmol/liter, preferably 1 to 30 mmol/liter. The ratio of the transition metal atom in the metallocene compound (D) to the titanium atom in the solid titanium catalyst component (A) is desirably in the range of 0.1 to 50, preferably 0.5 to 10.

It is desirable that the solid titanium catalyst component (A) is contacted with the metallocene compound (D) at a temperature of usually 0° to 150° C., preferably 20° to 100° C., for a contact time of 0.2 to 50 hours, preferably 0.5 to 10 hours, though this contact time varies depending on the temperature.

In the solid transition metal catalyst component [I-1] thus formed, the metallocene compound (D) is desirably supported on the solid titanium catalyst component (A) in such an amount that the transition metal/titanium ratio (by atom) becomes 0.02 to 10, preferably 0.05 to 5.

[I-2] Solid transition metal catalyst component

The solid transition metal catalyst component [I-2] is formed by causing (D-1) a solid catalyst component comprising a transition metal compound containing a ligand having cyclopentadienyl skeleton to support thereon (A-1) a titanium catalyst component containing magnesium, titanium, halogen and an electron donor.

The solid catalyst component (D-1) comprising a transition metal compound containing a ligand having cyclopentadienyl skeleton (metallocene compound) is specifically formed by causing a solid to support thereon the metallocene compound (D) that is described before in the preparation of the solid titanium catalyst component (A).

As the solid, there can be used the granular or particulate, inorganic or organic carriers having diameters of 10 to 300 $\mu$m, preferably 20 to 200 $\mu$m, which are described above with respect to the olefin polymerization catalyst (2).

In order to form the solid catalyst component [D-1] by causing the solid to support thereon the metallocene compound, the following processes can be utilized.

(1) The solid is contacted with the metallocene compound in a hydrocarbon solvent. In this process, the metallocene compound is preferably used as its hydrocarbon solvent solution.

(2) From a suspension obtained by the process (1), the hydrocarbon solvent is evaporated.

(3) Prior to the process (1), the solid is previously treated with an organoaluminum compound and a halogenated silicon compound.

(4) Prior to the process (1), the metallocene compound is previously treated with an organoaluminum compound.

Although the amounts of the components used for preparing the solid catalyst component (D-1) vary depending on the preparation processes, it is desirable that the metallocene compound is used in an amount of $5 \times 10^{-6}$ to $1 \times 10^{-2}$ mol, preferably $1 \times 10^{-5}$ to $5 \times 10^{-3}$ mol, based on 1 g of the solid.

In the solid catalyst component (D-1) thus obtained, the metallocene compound is desirably supported in an amount of $3 \times 10^{-6}$ to $3 \times 10^{-3}$ mol, preferably $5 \times 10^{-6}$ to $2 \times 10^{-3}$ mol, more preferably $1 \times 10^{-5}$ to $1 \times 10^{-3}$ mol, based on 1 g of the solid.

The solid transition metal catalyst component [I-2] used in the invention is formed by causing the solid catalyst component (D-1) to support thereon a titanium catalyst component (A-1) containing magnesium, titanium, halogen and an electron donor.

The titanium catalyst component (A-1) is obtained by contacting a magnesium compound, a titanium compound and an electron donor, and these components are the same as those shown in the preparation of the solid titanium catalyst component (A).

In order to form the solid transition metal component [I-2] by causing the solid catalyst component (D-1) to support thereon the titanium catalyst component (A-1), the following processes can be utilized.

(1) A liquid magnesium compound is reacted with an organoaluminum compound in the presence of the solid catalyst component (D-1) to precipitate a magnesium/aluminum complex on the solid catalyst component (D-1). Then, the precipitate is reacted with a titanium compound.

(2) A liquid magnesium compound is reacted with a liquid titanium compound and an organoaluminum compound in the presence of the solid catalyst component (D-1) to precipitate a magnesium/aluminum/titanium complex on the solid catalyst component (D-1).

(3) A liquid magnesium compound is reacted with a liquid titanium compound in the presence of the solid catalyst component (D-1) to precipitate a magnesium/titanium complex on the solid catalyst component (D-1).

(4) The solid component obtained in the process (3) is further reacted with a titanium compound.

(5) The solid catalyst component (D-1) is reacted with a liquid titanium compound and then reacted with a liquid magnesium compound.

In the above processes, the electron donor (a) may be added in any stage.

For preparing the solid transition metal catalyst component [I-2] in which the titanium catalyst component (A-1) is supported on the solid catalyst component (D-1), the magnesium compound is used in an amount of usually about 0.05 to 500 mol, preferably 0.1 to 200 mol; the titanium compound is used in an amount of usually about 0.02 to 100 mol, preferably 0.05 to 50 mol; and the electron donor (a) is used in an amount of 0.01 to 500 mol, preferably 0.05 to 200 mol, each based on 1 g.atom of the transition metal in the solid catalyst component (D-1).

The solid catalyst component (D-1) and the titanium catalyst component (A-1) are desirably contacted at a temperature of usually $-50°$ to $150°$ C., preferably $20°$ to $100°$ C., for a contact time of 0.2 to 100 hours, preferably 0.5 to 50 hours, though this contact time varies depending on the temperature.

In the solid transition metal catalyst component [I-2] thus obtained, it is desirable that the atomic ratio of the transition metal in the solid catalyst component (D-1) to titanium (transition metal/titanium) is in the range of 0.02 to 10, preferably 0.05 to 5; the atomic ratio of magnesium to titanium (Mg/Ti) is in the range of 1 to 100, preferably 2 to 50; and the atomic ratio of halogen to titanium (halogen/Ti) is in the range of 4 to 200, preferably 5 to 100.

In the present invention, also employable is a prepolymerized catalyst obtained by prepolymerizing an olefin of 2 or more carbon atoms in the presence of the catalyst components for forming the olefin polymerization catalyst (3) or (4). Examples of the olefins used for the prepolymerization are the same as those described before in the prepolymerization for the olefin polymerization catalyst (1).

It is desirable that the olefin is prepolymerized in an amount of 0.01 to 2,000 g, preferably 0.1 to 200 g, per 1 g of the solid transition metal catalyst component [I-1], to prepare a prepolymerized catalyst.

In the prepolymerization system, the concentration of the solid transition metal catalyst component is desired to be in the range of usually 0.01 to 200 mmol, preferably about 0.05 to 100 mmol, in terms of the transition metal atom, based on 1 liter of the polymerization volume.

The organometallic compound catalyst component (B) can be used in an amount of usually 0.1 to 100 mol, preferably 0.5 to 50 mol, based on 1 mol of the transition metal atom in the solid transition metal catalyst component. The electron donor (C) can be used, according to necessity, in an amount of usually 0.1 to 50 mol, preferably 0.5 to 30 mol, more preferably 1 to 10 mol, based on 1 mol of the transition metal atom.

The prepolymerization can be carried out using the above-mentioned olefin and catalyst components under mild reaction conditions in the presence of a hydrocarbon medium which is inert to prepolymerization.

The prepolymerization can be carried out in the same manner as in the prepolymerization for the olefin polymerization catalyst (1), except for using the above catalyst components.

Formation of propylene block copolymer component

In the second process for preparing an olefin polymer according to the invention, (i) a step for preparing a crystalline polypropylene component using the olefin polymerization catalyst (3) or (4) and (ii) a step for preparing a low-crystalline or non-crystalline ethylene/$\alpha$-olefin copolymer component using the olefin polymerization catalyst (3) or (4) are conducted in an arbitrary order to form a propylene block copolymer component. The step (i) for preparing a crystalline polypropylene component and the step (ii) for preparing a low-crystalline or non-crystalline ethylene/α-olefin copolymer component can be carried out in the same manner as in the first process for preparing an olefin polymer, except that the olefin polymerization catalyst (1) of the first process is replaced with the olefin polymerization catalyst (3) or (4).

In the step (i) for forming a crystalline polypropylene component, the solid transition metal catalyst component or the prepolymerized catalyst is desirably used in an amount of about 0.0001 to 50 mmol, preferably about 0.001 to 10 mmol, in terms of transition metal atom, based on 1 liter of the polymerization volume.

The organometallic compound (B) is desirably used in an amount of 1 to 2,000 mol, preferably 2 to 1,000 mol, based on 1 mol of the transition metal atom in the solid transition metal catalyst component. The electron donor (C) is desirably used in an amount of 0.001 to 5,000 mol, preferably 0.05 to 1,000 mol, based on 1 mol of the transition metal atom.

When the prepolymerized catalyst is used in the polymerization stage, the organometallic compound (B) and the electron donor (C) are arbitrary components, and they may be used or may not be used. If they are used, they can be added in the above-mentioned amounts based on the concentration of the transition metal atom in the polymerization system.

The electron donor (C), that is optionally added in the polymerization stage, may be the same as or different from the electron donor (C) used for forming the prepolymerized catalyst.

In the step (ii) of copolymerizing ethylene and the α-olefin, the polypropylene component (i) is used in an amount of 10 to 1,000 g, preferably 10 to 800 g, particularly preferably 30 to 500 g, based on 1 liter of the polymerization volume. It is desirable that the amount of the polypropylene corresponds to usually 0.0001 to 1 mmol, preferably about 0.001 to 0.5 mmol, per 1 liter of the polymerization volume, in terms of the transition metal atom of the solid transition metal catalyst component contained in the polypropylene (i).

In the present invention, the catalyst components can be further added to the system wherein the copolymerization of ethylene and the α-olefin is conducted in the presence of the polypropylene component (i). When the catalyst components are added, the solid transition metal catalyst component can be used in an amount of 0.0001 to 20 mmol, preferably 0.001 to 20 mmol, based on 1 liter of the polymerization volume; the electron donor (C) can be used in an amount of 0.001 to 5,000 mol, preferably 0.01 to 1,000 mol, based on 1 mol of the transition metal atom in the polymerization system; and the organometallic compound (B) can be used in an amount of 1 to 2,000 mol, preferably about 2 to 1,000 mol, based on 1 mol of the transition metal atom in the polymerization system.

If the propylene block copolymer component is prepared using the aforementioned prepolymerized catalyst, the units derived from olefin formed by the prepolymerization (prepolymer) are desirably contained in the finally obtained propylene block copolymer component in amounts of 0.001 to 3% by weight, preferably 0.005 to 2% by weight.

In the above-described step for preparing a propylene block copolymer component, a propylene block copolymer component containing a highly stereoregular polypropylene component can be obtained.

(iii) Formation of ethylene/α-olefin copolymer component

In the second process for preparing an olefin polymer according to the invention, the propylene block copolymer component is formed using the olefin polymerization catalyst (3) or (4) as described above; then the catalyst component (E) (the organoaluminum oxy-compound (E-1) and/or the Lewis acid or ionic compound (E-2) ) is added to the polymerization system in the presence of the propylene block copolymer component which has not been subjected to catalyst deactivation treatment; and (iii) ethylene is copolymerized with an α-olefin to form a low- and non-crystalline ethylene/α-olefin copolymer component, whereby an olefin polymer is prepared.

If necessary, an organoaluminum compound can be further added in addition to the catalyst component (E). for example, the same organoaluminum compound as described above as the organometallic compound (B) for forming the olefin polymerization catalyst is employable.

The catalyst component (E) is desirably added to the copolymerization system in such an amount that the atomic ratio of aluminum or boron in the catalyst component (E) to the transition metal present in the polymerization system (Al or B/transition metal) becomes usually 10 to 500, preferably 20 to 200.

The organoaluminum compound can be added, according to necessity, in such an amount that the atomic ratio of aluminum in the organoaluminum compound to aluminum or boron in the catalyst component (E) (Al/Al or B) becomes usually 0.02 to 3, preferably 0.05 to 1.5.

The step for forming the ethylene/α-olefin copolymer component (iii) can be carried out in the same manner as that for forming the ethylene/α-olefin copolymer component (iii) described in the first process for preparing an olefin polymer except for using the aforementioned catalyst components.

Third process for preparing olefin polymer

In the third process for preparing an olefin polymer according to the invention, (i) a step of homopolymerizing propylene or copolymerizing propylene and an α-olefin other than propylene in the presence of an olefin polymerization catalyst (5) which comprises [I-3] a solid transition metal catalyst component, (B) the organometallic compound, and optionally, (C) the electron donor, to form a crystalline polypropylene component and (ii) a step of copolymerizing ethylene and an α-olefin of 3 to 20 carbon atoms in the presence of the olefin polymerization catalyst (5) to form a low-crystalline or non-crystalline ethylene/α-olefin copolymer component are conducted in an arbitrary order to form a propylene block copolymer component;

then the transition metal compound (D) containing a ligand having cyclopentadienyl skeleton is added to the polymerization system; and (iii) ethylene is copolymerized with an α-olefin of 3 to 20 carbon atoms to form an ethylene/α-olefin copolymer component.

The solid transition metal catalyst component [I-3] used in the invention is formed by causing (A) the solid titanium catalyst component containing magnesium, titanium, halogen and an electron donor to support thereon (E) (E-1) the organoaluminum oxy-compound and/or (E-2) the Lewis acid or ionic compound.

[I-3] Solid transition metal catalyst component

In order to form the solid transition metal catalyst component [I-3] by causing the solid titanium catalyst component (A) to support thereon the catalyst component (E), the following processes can be utilized.

(1) The solid titanium catalyst component (A) is mixed and contacted with the component (E-1) and/or the component (E-2) in a hydrocarbon solvent.

(2) From a suspension obtained by the process (1), the hydrocarbon solvent is evaporated.

(3) The solid titanium catalyst component (A) and the component (E-1) and/or the component (E-2) are co-pulverized.

(4) The process (3) is carried out in the presence of a hydrocarbon solvent or a halogenated hydrocarbon solvent.

Of the above processes, the processes (1) and (2) are preferable.

More specifically, in the contact of the solid titanium catalyst component (A) with the component (E-1) and/or the component (E-2) in a hydrocarbon solvent, the solid titanium catalyst component (A) is desirably used in an amount of 0.1 to 200 mg.atom/liter-hydrocarbon solvent, preferably 1 to 50 mg.atom/liter, in terms of the titanium atom. The component (E-1) and/or the component (E-2) is desirably used in an amount of 0.1 to 5,000 mmol/liter, preferably 1 to 1,000 mmol/liter. The atomic ratio of aluminum in the component (E-1) and/or boron in the component (E-2) to the titanium atom in the solid titanium catalyst component (A) is desirably in the range of 0.1 to 1,000, preferably 0.5 to 5,000.

It is desirable that the solid titanium catalyst component (A) is contacted with the component (E-1) and/or the component (E-2) at a temperature of usually 0° to 150° C., preferably 20° to 100° C., for a contact time of 0.2 to 50 hours, preferably 0.5 to 10 hours, though this contact time varies depending on the temperature.

In the solid transition metal catalyst component [I-3] thus formed, the component (E) is desirably supported on the solid titanium catalyst component (A) in such an amount that the atomic ratio of aluminum in the component (E-1) and/or boron in the component (E-2) to titanium in the component (A) becomes 0.02 to 1000, preferably 0.05 to 500.

The olefin polymerization catalyst (5) is formed from the solid transition metal catalyst component [I-3], the organometallic compound (B), and optionally, the electron donor (C).

In the present invention, also employable is a prepolymerized catalyst obtained by prepolymerizing an olefin of 2 or more carbon atoms in the presence of the catalyst components for forming the olefin polymerization catalyst (5). The prepolymerized catalyst can be prepared in the same manner as that described with respect to the olefin polymerization catalyst (1), (3) or (4).

It is desirable that the olefin is prepolymerized in an amount of 0.01 to 2,000 g, preferably 0.1 to 200 g, based on 1 g of the solid transition metal catalyst component [I-3], to prepare a prepolymerized catalyst.

In the prepolymerization system, the concentration of the solid transition metal catalyst component is desired to be in the range of usually 0.01 to 200 mmol, preferably about 0.05 to 100 mmol, in terms of the transition metal atom, based on 1 liter of the polymerization volume.

The organometallic compound catalyst component (B) is desirably used in an amount of usually 0.1 to 100 mol, preferably 0.5 to 50 mol, based on 1 mol of the transition metal atom in the solid transition metal catalyst component.

The electron donor (C) is an arbitrary component in the prepolymerization stage, and it may be used or may not be used. The electron donor (C) can be used, according to necessity, in an amount of usually 0.1 to 50 mol, preferably 0.5 to 30 mol, more preferably 1 to 10 mol, based on 1 mol of the transition metal atom.

Formation of propylene block copolymer component

In the present invention, (i) a step of homopolymerizing propylene or copolymerizing propylene and an α-olefin other than propylene to prepare a crystalline polypropylene component using the olefin polymerization catalyst (5) and (ii) a step of copolymerizing ethylene and an α-olefin of 3 to 20 carbon atoms to prepare a low-crystalline or non-crystalline ethylene/α-olefin copolymer component using the olefin polymerization catalyst (5) are conducted in an arbitrary order to form a propylene block copolymer component. The step (i) for preparing a crystalline polypropylene component and the step (ii) for preparing a low-crystalline or non-crystalline ethylene/α-olefin copolymer component can be carried out in the same manner as in the first process for preparing an olefin polymer, except that the olefin polymerization catalyst (1) of the first process is replaced with the olefin polymerization catalyst (5).

In the step (i) for forming a crystalline polypropylene component, the solid transition metal catalyst component [I-3] or the prepolymerized catalyst is desirably used in an amount of about 0.0001 to 50 mmol, preferably about 0.001 to 10 mmol, in terms of the transition metal atom, based on 1 liter of the polymerization volume.

The organometallic compound (B) can be used in an amount of 1 to 2,000 mol, preferably 2 to 1,000 mol, based on 1 mol of the transition metal atom in the solid transition metal catalyst component. When the prepolymerized catalyst is used, the organometallic compound (B) is an arbitrary component, and it may be used or may not be used.

In the polymerization step (i), the electron donor (C) is an arbitrary component, and it may be used or may not be used. The electron donor (C) can be used, according to necessity, in an amount of 0.001 to 5,000 mol, preferably 0.05 to 1,000 mol, based on 1 mol of the transition metal atom.

The organometallic compound (B) and the electron donor (C), which are used in the polymerization stage, may be the same as or different from the organometallic compound (B) and the electron donor (C) used for forming the prepolymerized catalyst.

In the present invention, the crystalline polypropylene component (i) is formed as described above, and then a low-crystalline or non-crystalline ethylene/α-olefin copolymer component (ii) is formed by copolymerizing ethylene and an α-olefin without performing a deactivation treatment of the olefin polymerization catalyst used for preparing the polypropylene component, whereby a propylene block copolymer is prepared.

In the ethylene/α-olefin copolymerization system, the polypropylene component is used in an amount of 10 to 1,000 g, preferably 10 to 800 g, particularly preferably 30 to 500 g, based on 1 liter of the polymerization volume. It is desirable that the amount of the polypropylene corresponds to usually 0.0001 to 1 mmol, preferably about 0.001 to 0.5 mmol, in terms of the transition metal atom of the solid transition metal catalyst component contained in the polypropylene (i), based on 1 liter of the polymerization volume.

In the present invention, the catalyst components can be further added to the system wherein copolymerization of ethylene and the α-olefin is conducted in the presence of the polypropylene component. When the catalyst components are added, the solid transition metal catalyst component [I-3] can be used in an amount of 0.0001 to 20 mmol, preferably 0.001 to 20 mmol, based on 1 liter of the polymerization volume; the electron donor (C) can be used in an amount of 0.001 to 5,000 mol, preferably 0.01 to 1,000 mol, based on 1 mol of the transition metal atom in the polymerization system; and the organometallic compound (B) can be used in an amount of 1 to 2,000 mol, preferably about 2 to 1,000 mol, based on 1 mol of the transition metal atom in the polymerization system.

If the propylene block copolymer component is prepared using the aforementioned prepolymerized catalyst, the units derived from olefin formed by the prepolymerization (prepolymer) are desirably contained in the finally obtained propylene block copolymer component in amounts of 0.001 to 3% by weight, preferably 0.005 to 2% by weight.

In the above-described step for preparing a propylene block copolymer component, a propylene block copolymer component containing a highly stereoregular polypropylene component can be obtained.

(iii) Formation of ethylene/α-olefin copolymer component

In the third process for preparing an olefin polymer according to the invention, the propylene block copolymer component is formed by the use of the olefin polymerization catalyst (5) as described above; then the transition metal compound (metallocene compound) (D) containing a ligand having cyclopentadienyl skeleton is added to the polymerization system in the presence of the propylene block copolymer component which has not been subjected to catalyst deactivation treatment; and (iii) ethylene is copolymerized with an α-olefin to form a low-crystalline or non-crystalline ethylene-α-olefin copolymer component, whereby an olefin polymer is prepared.

In the present invention, the metallocene compounds (D) can be used in combination of two or more kinds.

In the ethylene/α-olefin copolymerization step (iii), the metallocene compound (D) is used in such an amount that the atomic ratio of aluminum or boron present in the polymerization system to the transition metal in the metallocene compound (D) (Al or B/transition metal) becomes usually 0.0001 to 10, preferably 0.005 to 5.

The step for forming the ethylene/α-olefin copolymer component (iii) can be carried out in the same manner as that for forming the ethylene/α-olefin copolymer component (iii) described in the first process for preparing an olefin polymer except for using the aforementioned polymerization catalyst components.

According to the processes of the present invention, an olefin polymer having excellent impact strength as well as excellent mechanical strength such as rigidity can be obtained.

In the present invention, further, the yield of the olefin polymer based on the solid titanium catalyst component unit is high, so that the catalyst residue in the resulting polymer, particularly halogen content, can be relatively reduced. Therefore, an operation to remove the catalyst remaining in the resulting olefin polymer can be omitted, and besides rusting of a mold can be inhibited when the obtained olefin polymer is molded.

Since the olefin polymer obtained by the present invention are excellent also in moldability, transparency and heat resistance, it can be molded into various articles applicable to wide uses.

This olefin polymer desirably has a melt flow rate MFR (ASTM D 1238, 230° C., under a load of 2.16 kg) of 0.01 to 500 g/10 min, preferably 0.05 to 300 g/10 min.

The olefin polymer desirably has a bulk specific gravity of 0.20 to 0.70 g/ml, preferably 0.25 to 0.65 g/ml.

Prior to use, to the olefin polymer obtained by the present invention can be further added other components, as far as not prejudicial to the objects of the invention.

For example, thermoplastic resins and thermosetting resins can be added as the other components. Particular examples thereof include polyethylene, polypropylene other than the above-mentioned one, α-olefin homopolymers such as poly-1-butene, copolymers of α-olefins, copolymers of α-olefins and vinyl monomers, modified olefin polymers such as maleic anhydride-modified polypropylene, nylon, polycarbonate, ABS, polystyrene, polyvinyl chloride, polyphenylene oxide, petroleum resin and phenol resin.

Moreover, various additives may be added to the olefin polymer obtained by the invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, anti-foaming agents, flame retardants, crosslinking agents, flowability improvers such as peroxides, ultraviolet light absorbers, light stabilizers, weathering stabilizers, weld strength improvers, slip agents, anti-blocking agents, antifogging agents, dyes, pigments, natural oils, synthetic oils, waxes, fillers and rubber ingredients.

EXAMPLE

The present invention will be further described with reference to the following examples, but it should be construed that the invention is in no way limited to those examples.

The olefin polymers obtained in the following examples and comparative examples were measured on their flexural modulus (FM) and Izod impact strength (IZ) in the manner described below.

To 100 parts by weight of the olefin polymer were added 0.05 part by weight of tetrakis(methylene(3,5-di-t-butyl-4-hydroxy)hydrocinnamate)methane, 0.05 part by weight of tris(mixed mono- & dinonylphenyl phosphite) and 0.1 part by weight of calcium stearate, followed by mixing them. The mixture was kneaded and granulated at 250° C. by means of an extrusion granulator (manufactured by Thermoplastic Co.) having a screw diameter of 20 mm, to obtain granulates of the olefin polymer.

The granulates were molded by means of an injection molding machine (manufactured by Toshiba Kikai K. K.) at a molding temperature of 200° C., to give the following ASTM standard specimens. The specimens were measured on the flexural modulus (FM) and Izod impact strength (IZ) in accordance with the ASTM standard methods.

Flexural modulus (FM): in accordance with ASTM-D790 specimen: 12.7 cm×12.7 mm×3.0 mm Izod impact strength (IZ): in accordance with ASTM-D256 specimen: 12.7 cm×12.7 mm×3.0 mm back notched Example 1

Preparation of prepolymerized catalyst (a) as olefin polymerization catalyst (1)

Preparation of solid titanium catalyst component (A)

Anhydrous magnesium chloride (95.2 g), decane (442 ml) and 2-ethylhexyl alcohol (390.6 g) were reacted with each other under heating at 130° C. for 2 hours to give a homogeneous solution. To the solution was added 21.3 g of phthalic anhydride, and they were mixed and stirred at 130° C. for 1 hour to dissolve the phthalic anhydride in the solution.

The resulting homogeneous solution was cooled to room temperature, and 75 ml of this solution was dropwise added to 200 ml of titanium tetrachloride kept at −20° C., over a period of 1 hour. After the addition was completed, the temperature of the mixture was elevated to 110° C. over a period of 4 hours. When the temperature reached 110° C., 5.22 g of diisobutyl phthalate (DIBP) was added, and the system was maintained at the same temperature for 2 hours.

After the two-hour reaction was completed, the resulting solid was collected by hot filtration. The solid was resuspended in 275 ml of titanium tetrachloride, and the suspension was heated again at 110° C. for 2 hours.

After the reaction was completed, the resulting solid was collected again by hot filtration, and the solid was sufficiently washed with decane of 110° C. and hexane until no titanium compound liberated in the solution was detected.

The solid titanium catalyst component (A) thus prepared was stored as its decane slurry, but a part of it was dried to analyze its catalyst composition.

The solid titanium catalyst component (A) had a composition of 2.3% by weight of titanium, 61% by weight of chlorine, 19% by weight of magnesium and 12.5% by weight of DIBP.

Prepolymerization

In a nitrogen atmosphere, to a 400 ml four-necked glass reactor equipped with a stirrer were introduced 100 ml of purified hexane, 10 mmol of triethylaluminum, 2 mmol of 2-isopentyl-2-isopropyl-1,3-dimethoxypropane (IPAMP) and 1 mmol (in terms of titanium atom) of the solid titanium catalyst component (A) obtained above. Then, propylene was fed to the reactor at a feed rate of 3.2N liter/hr for 1 hour. The polymerization temperature was maintained at 20° C.

When feeding of propylene was completed, the reactor was purged with nitrogen. Then, a washing operation consisting of removal of a supernatant liquid and addition of purified hexane was carried out twice. The reaction product was resuspended in purified hexane, and all of the suspension was transferred into a bottle for storing a catalyst. Thus, a prepolymerized catalyst (a) was obtained.

Preparation of prepolymerized catalyst (b) as olefin polymerization catalyst (2)

Preparation of solid metallocene catalyst

In 154 liters of toluene was suspended 10.0 kg of silica having been dried at 250° C. for 10 hours, and the suspension was cooled to 0° C. To the suspension was dropwise added 57.5 liters of a toluene solution of methylaluminoxane (Al=1.33 mol/l) over a period of 1 hour. During the addition, the temperature of the system was maintained at 0° C. Subsequently, the reaction was conducted at 0° C. for 30 minutes, then the temperature was elevated up to 95° C. over a period of 1.5 hours, and at that temperature the reaction was run for 20 hours. Thereafter, the temperature of the system was lowered to 60° C., and the supernatant liquid was removed by decantation.

The solid obtained above was washed twice with toluene and resuspended in 100 liter of toluene. To the system, 16.8 liters of a toluene solution of bis(1-n-butyl-3-methylcyclopentadienyl)zirconium dichloride (Zr=27.0 mmol/l) was dropwise added at 80° C. over a period of 30 minutes, and the reaction was further conducted at 80° C. for 2 hours. Then, the supernatant liquid was removed, and the remainder was washed twice with hexane to obtain a solid catalyst containing 3.5 mg of zirconium per 1 g of the catalyst.

Prepolymerization

To 87 liters of a hexane solution containing 2.5 mol of triisobutylaluminum were added 870 g of the solid catalyst obtained above and 260 g of 1-hexene, and prepolymerization of ethylene was effected at 35° C. for 5 hours. Thus, a metallocene prepolymerized catalyst (b) containing polyethylene as a prepolymer in an amount of 10 g based on 1 g of the solid catalyst was obtained.

Preparation of olefin polymer

Polymerization

To a 17 liter autoclave were introduced 3 kg of propylene and 45 liters of hydrogen, and the temperature was elevated to 60° C. Then, 15 mmol of triethylaluminum, 15 mmol of dicyclopentyldimethoxysilane (DCPMS) and 0.05 mmol (in terms of titanium atom) of the above-obtained prepolymerized catalyst (a) were added. The temperature of the system was elevated to 70° C. and maintained at that temperature for 40 minutes to effect homopolymerization of propylene.

After the homopolymerization of propylene was completed, the vent valve is opened to release the pressure until the pressure in the polymerization reactor became atmospheric pressure.

After the pressure was released, copolymerization of ethylene and propylene was conducted. That is, to the polymerization reactor were fed ethylene at a feed rate of 240N liter/hr, propylene at a feed rate of 960N liter/hr and hydrogen at a feed rate of 10N liter/hr. The vent opening of the reactor was adjusted so that the pressure in the reactor became 10 kg/cm$^2$-G. The temperature was maintained at 70° C., and the polymerization was performed for 50 minutes.

After the copolymerization of ethylene and propylene was completed, the vent valve was opened to release the unreacted ethylene and propylene until the pressure in the polymerization reactor became atmospheric pressure, followed by reducing the pressure.

After the reduction of pressure was completed, copolymerization of ethylene and 1-butene was conducted. That is, a mixed gas of ethylene and 1-butene (1-butene content: 12.3% by mol) was fed to the reactor so that the pressure was returned to atmospheric pressure. The temperature of the system was set to 55° C.

Then, 0.04 mmol (in terms of zirconium atom) of the above-obtained metallocene prepolymerized catalyst (b) and 4 mmol of triisobutylaluminum were added to the autoclave.

Thereafter, 400 ml of hydrogen and the mixed gas of ethylene and 1-butene were fed to effect polymerization at 60° C. for 40 minutes with maintaining the total pressure at 8 kg/cm$^2$-G.

The unreacted gas was purged out of the polymerization reactor, and the resulting white powder was dried at 80° C. under reduced pressure to obtain a polymer (olefin polymer). The yield was 2,426 g.

The olefin polymer had MFR of 32 g/10 min and a bulk specific gravity of 0.43 g/ml. The results are set forth in Table 1.

Example 2

An olefin polymer was obtained in the same manner as in Example 1 except that polymerization was conducted by the following process.

Polymerization

To a 17 liter autoclave were introduced 3 kg of propylene and 45 liters of hydrogen, and the temperature was elevated to 60° C. Then, 15 mmol of triethylaluminum, 15 mmol of dicyclopentyldimethoxysilane (DCPMS) and 0.05 mmol (in terms of titanium atom) of the prepolymerized catalyst (a) obtained in Example 1 were added. The temperature of the system was elevated to 70° C. and maintained at that temperature for 40 minutes to effect homopolymerization of propylene.

After the homopolymerization of propylene was completed, the vent valve is opened to release the pressure until the pressure in the polymerization reactor became atmospheric pressure.

After the pressure was released, copolymerization of ethylene and propylene was conducted. That is, to the polymerization reactor were fed ethylene at a feed rate of 240N liter/hr and propylene at a feed rate of 960N liter/hr. The vent opening of the reactor was adjusted so that the pressure in the reactor became 10 kg/cm$^2$-G. The temperature was maintained at 70° C., and the polymerization was performed for 80 minutes.

After the copolymerization of ethylene and propylene was completed, the vent valve was opened to release the unreacted ethylene and propylene until the pressure in the polymerization reactor became atmospheric pressure, followed by reducing the pressure.

After the reduction of pressure was completed, copolymerization of ethylene and 1-butene was performed. That is, a mixed gas of ethylene and 1-butene (1-butene content: 12.3% by mol) was fed to the reactor so that the pressure was returned to atmospheric pressure. The temperature of the system was set to 55° C.

Then, 0.04 mmol (in terms of zirconium atom) of the metallocene prepolymerized catalyst (b) and 4 mmol of triisobutylaluminum were added to the autoclave.

Thereafter, 400 ml of hydrogen and the mixed gas of ethylene and 1-butene were fed to effect polymerization at 60° C. for 40 minutes with maintaining the total pressure at 8 kg/cm$^2$-G.

The unreacted gas was purged out of the polymerization reactor, and the resulting white powder was dried at 80° C. under reduced pressure to obtain an olefin polymer.

The results are set forth in Table 1.

Comparative Example 1

An olefin polymer was obtained in the same manner as in Example 1 except that in the copolymerization of ethylene and 1-butene, none of the metallocene prepolymerized catalyst (b) and triisobutylaluminum were added, the amount of hydrogen fed was varied to 800 ml, and the polymerization was performed at 60° C. for 90 minutes.

The results are set forth in Table 1.

Comparative Example 2

An olefin polymer was obtained in the same manner as in Example 2 except that in the copolymerization of ethylene and 1-butene, none of the metallocene prepolymerized catalyst (b) and triisobutylaluminum were added, the amount of hydrogen fed was varied to 800 ml, and the polymerization was performed at 60° C. for 90 minutes.

The results are set forth in Table 1.

TABLE 1

| | Yield of Polymer | MFR | FM | IZ (kg · cm/cm) | |
|---|---|---|---|---|---|
| | (g) | (g/10 min) | (kg/cm$^2$) | 23° C. | −30° C. |
| Ex. 1 | 2,426 | 32 | 9,400 | 22 | 3.4 |
| Ex. 2 | 2,353 | 31 | 9,000 | 24 | 4.1 |
| Comp. Ex. 1 | 2,380 | 32 | 8,600 | 17 | 3.0 |
| Comp. Ex. 2 | 2,296 | 30 | 7,900 | 19 | 3.0 |

Example 3

Preparation of solid transition metal catalyst component [I-1]

To a 200 ml glass flask thoroughly purged with nitrogen were introduced 0.5 mmol (in terms of titanium atom) of the solid titanium catalyst component (A) prepared in Example 1, 37.0 ml of a toluene solution of bis(1-n-butyl-3-methylcyclopentadienyl)zirconium dichloride (Zr=27.0 mmol/l) and 13 ml of toluene, and they were stirred at 80° C. for 2 hours. Then, toluene was removed by means of an evaporator under reduced pressure, and the resulting solid was washed several times with toluene to obtain a solid transition metal catalyst component [I-1]. In the solid transition metal catalyst component [I-1], the atomic ratio of zirconium to titanium (Zr/Ti) was 0.38.

Prepolymerization

In a nitrogen atmosphere, to a 400 ml four-necked glass reactor equipped with a stirrer were introduced 100 ml of purified hexane, 10 mmol of triethylaluminum, 2 mmol of 2-isopentyl-2-isopropyl-1,3-dimethoxypropane (IPAMP) and 1 mmol (in terms of titanium atom) of the above-obtained solid transition metal catalyst component [I-1]. Then, propylene was fed to the reactor at a feed rate of 3.2N liter/hr for 1 hour. The polymerization temperature was maintained at 20° C.

When feeding of propylene was completed, the reactor was purged with nitrogen. Then, a washing operation consisting of removal of a supernatant liquid and addition of purified hexane was carried out twice. The reaction product was resuspended in purified hexane, and all of the suspension was transferred into a bottle for storing a catalyst. Thus, a prepolymerized catalyst (c) was obtained.

Polymerization

To a 17 liter autoclave were introduced 3 kg of propylene and 45 liters of hydrogen, and the temperature was elevated to 60° C. Then, 15 mmol of triethylaluminum, 15 mmol of dicyclopentyldimethoxysilane (DCPMS) and 0.05 mmol (in terms of titanium atom) of the above-obtained prepolymerized catalyst (c) were added. The temperature of the system was elevated to 70° C. and maintained at that temperature for 40 minutes to effect homopolymerization of propylene.

After the homopolymerization of propylene was completed, the vent valve is opened to release the pressure until the pressure in the polymerization reactor became atmospheric pressure.

After the pressure was released, copolymerization of ethylene and propylene was conducted. That is, to the polymerization reactor were fed ethylene at a feed rate of 240N liter/hr, propylene at a feed rate of 960N liter/hr and hydrogen at a feed rate of 10N liter/hr. The vent opening of the reactor was adjusted so that the pressure in the reactor became 10 kg/cm$^2$-G. The temperature was maintained at 70° C., and the polymerization was performed for 50 minutes.

After the copolymerization of ethylene and propylene was completed, the vent valve was opened to release the unreacted ethylene and propylene until the pressure in the reactor became atmospheric pressure, followed by reducing the pressure.

After the reduction of pressure was completed, copolymerization of ethylene and 1-butene was performed. That is, a mixed gas of ethylene and 1-butene (1-butene content: 12.3% by mol) was fed to the reactor so that the pressure was returned to atmospheric pressure. The temperature of the system was set to 55° C.

Then, 4 mmol (in terms of Al atom) of methylaluminoxane and 2 mmol of triisobutylaluminum were added to the autoclave.

Thereafter, 400 ml of hydrogen and the mixed gas of ethylene and 1-butene were fed to effect polymerization at 60° C. for 1 hour with maintaining the total pressure at 8 kg/cm$^2$-G.

The unreacted gas was purged out of the polymerization reactor, and the resulting white powder was dried at 80° C. under reduced pressure to obtain a polymer (olefin polymer). The yield was 2,385 g.

The olefin polymer had MFR of 33 g/10 min and a bulk specific gravity of 0.44 g/ml. The results are set forth in Table 2.

Example 4

An olefin polymer was obtained in the same manner as in Example 3 except that polymerization was conducted by the following process.

Polymerization

To a 17 liter autoclave were introduced 3 kg of propylene and 45 liters of hydrogen, and the temperature was elevated to 60° C. Then, 15 mmol of triethylaluminum, 15 mmol of dicyclopentyldimethoxysilane (DCPMS) and 0.05 mmol (in terms of titanium atom) of the prepolymerized catalyst (c) obtained in Example 3 were added. The temperature of the system was elevated to 70° C. and maintained at that temperature for 40 minutes to effect homopolymerization of propylene.

After the homopolymerization of propylene was completed, the vent valve is opened to release the pressure until the pressure in the polymerization reactor became atmospheric pressure.

After the pressure was released, copolymerization of ethylene and propylene was conducted. That is, to the polymerization reactor were fed ethylene at a feed rate of 240N liter/hr and propylene at a feed rate of 960N liter/hr. The vent opening of the reactor was adjusted so that the pressure in the reactor became 10 kg/cm$^2$-G. The temperature was maintained at 70° C., and the polymerization was performed for 80 minutes.

After the copolymerization of ethylene and propylene was completed, the vent valve was opened to release the unreacted ethylene and propylene until the pressure in the reactor became atmospheric pressure, followed by reducing the pressure.

After the reduction of pressure was completed, copolymerization of ethylene and 1-butene was performed. That is, a mixed gas of ethylene and 1-butene (1-butene content: 12.3% by mol) was fed to the reactor so that the pressure was returned to atmospheric pressure. The temperature of the system was set to 55° C.

Then, 4 mmol (in terms of Al atom) of methylaluminoxane and 2 mmol of triisobutylaluminum were added to the autoclave.

Thereafter, 400 ml of hydrogen and the mixed gas of ethylene and 1-butene were fed to effect polymerization at 60° C. for 1 hour with maintaining the total pressure at 8 kg/cm$^2$-G.

The unreacted gas was purged out of the polymerization reactor, and the resulting white powder was dried at 80° C. under reduced pressure to obtain a polymer (olefin polymer).

The results are set forth in Table 2.

Comparative Example 3

A polymer was obtained in the same manner as in Example 3 except that in the copolymerization of ethylene and 1-butene, none of methylaluminoxane and triisobutylaluminum were added, the amount of hydrogen fed was varied to 800 ml, and the polymerization was performed at 60° C. for 90 minutes.

The results are set forth in Table 2.

Comparative Example 4

A polymer was obtained in the same manner as in Example 4 except that in the copolymerization of ethylene and 1-butene, none of methylaluminoxane and triisobutylaluminum were added, the amount of hydrogen fed was varied to 800 ml, and the polymerization was performed at 60° C. for 90 minutes.

The results are set forth in Table 2.

TABLE 2

| | Yield of Polymer | MFR | FM | IZ (kg · cm/cm) | |
|---|---|---|---|---|---|
| | (g) | (g/10 min) | (kg/cm$^2$) | 23° C. | −30° C. |
| Ex. 3 | 2,385 | 33 | 9,300 | 21 | 3.3 |
| Ex. 4 | 2,327 | 32 | 8,800 | 23 | 4.1 |
| Comp. Ex. 3 | 2,340 | 32 | 8,500 | 17 | 3.1 |
| Comp. Ex. 4 | 2,295 | 31 | 7,800 | 18 | 3.0 |

Example 5

Preparation of solid zirconium catalyst component (I-1)

To a 400 ml glass flask thoroughly purged with nitrogen were introduced 5 g of silica (mean particle diameter: 70 μm, specific surface area: 260 m$^3$/g, pore volume: 1.65 cm$^3$/g) having been calcined at 700° C. for 5 hours, 52 ml of a toluene solution of dimethylaluminum monochloride (Al=1 mol/l) and 100 ml of toluene, and they were heated at 80° C. for 2 hours. Then, the supernatant liquid was removed by decantation, and the remainder was washed with toluene. Thereafter, 100 ml of toluene and 38.5 ml of a toluene solution of bis(1-n-butyl-3-methylcyclopentadienyl) zirconium dichloride (Zr=27.0 mmol/l) were added, followed by heating again at 80° C. for 1 hour. Then, toluene was distilled off by an evaporator under reduced pressure, and the resulting solid was washed with toluene to obtain a solid zirconium catalyst component (I-1) in which 9.0 mg of zirconium was supported based on 1 g of silica.

Preparation of solid transition metal catalyst component [I-2]

To a 200 ml glass flask thoroughly purged with nitrogen were introduced 5 g of the solid zirconium catalyst component (1-1), 3.2 ml of a hexane solution of diethylaluminum monochloride (Al=1.0 mol/l) and 35 ml of hexane.

Then, 1.5 ml of a hexane solution having a composition of MgCl$_2$.3(2-ethylhexyl alcohol).0.4 TiCl$_4$ (Mg=1.0 mol/l) was added at 25° C., and the temperature of the system was elevated to evaporate hexane, to obtain a solid.

The solid was suspended in 50 ml of titanium tetrachloride, and the temperature of the system was elevated to 110° C. When the temperature reached 110° C., 0.5 g of diisobutyl phthalate (DIBP) was added, and the mixture was stirred at the same temperature for 2 hours.

After the reaction was completed, the resulting solid was collected by hot filtration, and the solid was resuspended in 50 ml of titanium tetrachloride. The suspension was heated again at 110° C. for 2 hours.

After the reaction was completed, the resulting solid was collected again by hot filtration, and the solid was sufficiently washed with decane of 110° C. and hexane until no titanium compound liberated in the solution was detected. Thus, a solid transition metal catalyst component [I-2] was obtained. In the solid transition metal catalyst component [I-2], the atomic ratio of zirconium to titanium (Zr/Ti) was 0.95.

Preparation of prepolymerized catalyst (d)

In a nitrogen atmosphere, to a 400 ml four-necked glass reactor equipped with a stirrer were introduced 100 ml of purified hexane, 10 mmol of triethylaluminum, 2 mmol of 2-isopentyl-2-isopropyl-1,3-dimethoxypropane and 1 mmol (in terms of titanium atom) of the above-obtained solid transition metal catalyst component [I-2]. Then, propylene was fed to the reactor at a feed rate of 3.2N liter/hr at 20° C. for 1 hour. When feeding of propylene was completed, the reactor was purged with nitrogen. Then, a washing operation consisting of removal of a supernatant liquid and addition of purified hexane was carried out twice. The reaction product was resuspended in purified hexane, and all of the suspension was transferred into a bottle for storing a catalyst. Thus, a prepolymerized catalyst (d) was obtained.

Polymerization

To a 17 liter autoclave were introduced 3 kg of propylene and 45 liters of hydrogen, and the temperature was elevated to 60° C. Then, 15 mmol of triethylaluminum, 15 mmol of dicyclopentyldimethoxysilane and 0.05 mmol (in terms of titanium atom) of the above-obtained prepolymerized catalyst (d) were added. The temperature of the system was elevated to 70° C. and maintained at that temperature for 40 minutes to effect homopolymerization of propylene.

After the homopolymerization of propylene was completed, the vent valve is opened to release the pressure until the pressure in the polymerization reactor became atmospheric pressure.

After the pressure was released, copolymerization of ethylene and propylene was conducted. That is, to the polymerization reactor were fed ethylene at a feed rate of 240N liter/hr, propylene at a feed rate of 960N liter/hr and hydrogen at a feed rate of 10N liter/hr. The vent opening of the reactor was adjusted so that the pressure in the reactor became 10 kg/cm²-G. The temperature was maintained at 70° C., and the polymerization was performed for 50 minutes.

After the copolymerization of ethylene and propylene was completed, the vent valve was opened to release the unreacted ethylene and propylene until the pressure in the reactor became atmospheric pressure, followed by reducing the pressure.

After the reduction of pressure was completed, copolymerization of ethylene and 1-butene was performed. That is, a mixed gas of ethylene and 1-butene (1-butene content: 12.3% by mol) was fed to the reactor so that the pressure was returned to atmospheric pressure. The temperature of the system was set to 55° C.

Then, 5 mmol of triisobutylaluminum and 10 mmol (in terms of aluminum atom) of methylaluminoxane were added to the autoclave.

Thereafter, 400 ml of hydrogen and the mixed gas of ethylene and 1-butene were fed to effect polymerization at 60° C. for 50 minutes with maintaining the total pressure at 8 kg/cm²-G.

The unreacted gas was purged out of the polymerization reactor, and the resulting white powder was dried at 80° C. under reduced pressure to obtain a polymer (olefin polymer). The yield was 2,158 g.

The olefin polymer had MFR of 32 g/10 min and a bulk specific gravity of 0.42 g/ml. The results are set forth in Table 3.

Example 6

An olefin polymer was obtained in the same manner as in Example 5 except that polymerization was conducted by the following process.

Polymerization

To a 17 liter autoclave were introduced 3 kg of propylene and 45 liters of hydrogen were introduced, and the temperature was elevated to 60° C. Then, 15 mmol of triethylaluminum, 15 mmol of dicyclopentyldimethoxysilane and 0.05 mmol (in terms of titanium atom) of the prepolymerized catalyst (d) obtained in Example 5 were added. The temperature of the system was elevated to 70° C. and maintained at that temperature for 40 minutes to effect homopolymerization of propylene.

After the homopolymerization of propylene was completed, the vent valve is opened to release the pressure until the pressure in the polymerization reactor became atmospheric pressure.

After the pressure was released, copolymerization of ethylene and propylene was conducted. That is, to the polymerization reactor were fed ethylene at a feed rate of 240N liter/hr and propylene at a feed rate of 960N liter/hr. The vent opening of the reactor was adjusted so that the pressure in the reactor became 10 kg/cm²-G. The temperature was maintained at 70° C., and the polymerization was performed for 80 minutes.

After the copolymerization of ethylene and propylene was completed, the vent valve was opened to release the unreacted ethylene and propylene until the pressure in the reactor became atmospheric pressure, followed by reducing the pressure. After the reduction of pressure was completed, copolymerization of ethylene and 1-butene was performed. That is, a mixed gas of ethylene and 1-butene (1-butene content: 12.3% by mol) was fed to the reactor so that the pressure was returned to atmospheric pressure. The temperature of the system was set to 55° C.

Then, 5 mmol of triisobutylaluminum and 10 mmol (in terms of aluminum atom) of methylaluminoxane were added to the autoclave.

Thereafter, 400 ml of hydrogen and the mixed gas of ethylene and 1-butene were fed to effect polymerization at 60° C. for 50 minutes with maintaining the total pressure at 8 kg/cm²-G.

The unreacted gas was purged out of the polymerization reactor, and the resulting white powder was dried at 80° C. under reduced pressure to obtain a polymer (olefin polymer).

The results are set forth in Table 3.

Comparative Example 5

A polymer was obtained in the same manner as in Example 5 except that in the copolymerization of ethylene and 1-butene, none of triisobutylaluminum and methylaluminoxane were added, the amount of hydrogen fed was varied to 900 ml, and the polymerization was performed at 60° C. for 100 minutes.

The results are set forth in Table 3.

Comparative Example 6

A polymer was obtained in the same manner as in Example 6 except that in the copolymerization of ethylene and 1-butene, none of triisobutylaluminum and methylaluminoxane were added, the amount of hydrogen fed was varied to 900 ml, and the polymerization was performed at 60° C. for 100 minutes.

The results are set forth in Table 3.

TABLE 3

| | Yield of Polymer (g) | MFR (g/10 min) | FM (kg/cm$^2$) | IZ (kg · cm/cm) 23° C. | IZ (kg · cm/cm) −30° C. |
|---|---|---|---|---|---|
| Ex. 5 | 2,158 | 32 | 9,300 | 20 | 3.3 |
| Ex. 6 | 2,096 | 30 | 8,700 | 22 | 3.9 |
| Comp. Ex. 5 | 2,173 | 31 | 8,300 | 16 | 2.9 |
| Comp. Ex. 6 | 2,041 | 30 | 7,700 | 16 | 2.7 |

Example 7

Preparation of solid transition metal catalyst component [I-3]

To a 200 ml glass flask thoroughly purged with nitrogen were introduced 50 ml of toluene, 0.5 mmol (in terms of titanium atom) of the above-prepared solid titanium catalyst component (A), 37.6 ml of a toluene solution of methylaluminoxane (Al=1.33 mmol/l), and they were stirred at 20° C. for 30 minutes.

Then, toluene was removed by means of an evaporator under reduced pressure, and the resulting solid was washed several times with toluene to obtain a solid transition metal catalyst component [I-3].

In the solid transition metal catalyst component [I-3], the atomic ratio of aluminum to titanium (Al/Ti) was 85.

Prepolymerization

In a nitrogen atmosphere, to a 400 ml four-necked glass reactor equipped with a stirrer were introduced 100 ml of purified hexane, 10 mmol of triethylaluminum, 2 mmol of 2-isopentyl-2-isopropyl-1,3-dimethoxypropane (IPAMP) and 1 mmol (in terms of titanium atom) of the above-obtained solid transition metal catalyst component [I-3]. Then, propylene was fed to the reactor at a feed rate of 3.2N liter/hr for 1 hour. The polymerization temperature was maintained at 20° C.

When feeding of propylene was completed, the reactor was purged with nitrogen. Then, a washing operation consisting of removal of a supernatant liquid and addition of purified hexane was carried out twice. The reaction product was resuspended in purified hexane, and all of the suspension was transferred into a bottle for storing a catalyst. Thus, a prepolymerized catalyst (e) was obtained.

Polymerization

To a 17 liter autoclave were introduced 3 kg of propylene and 45 liters of hydrogen, and the temperature was elevated to 60° C. Then, 15 mmol of triethylaluminum, 15 mmol of dicyclopentyldimethoxysilane (DCPMS) and 0.05 mmol (in terms of titanium atom) of the above-obtained prepolymerized catalyst (e) were added. The temperature of the system was elevated to 70° C. and maintained at that temperature for 40 minutes to effect homopolymerization of propylene.

After the homopolymerization of propylene was completed, the vent valve is opened to release the pressure until the pressure in the polymerization reactor became atmospheric pressure.

After the pressure was released, copolymerization of ethylene and propylene was conducted. That is, to the polymerization reactor were fed ethylene at a feed rate of 240N liter/hr, propylene at a feed rate of 960N liter/hr and hydrogen at a feed rate of 10N liter/hr. The vent opening of the reactor was adjusted so that the pressure in the reactor became 10 kg/cm$^2$-G. The temperature was maintained at 70° C., and the polymerization was performed for 50 minutes.

After the copolymerization of ethylene and propylene was completed, the vent valve was opened to release the unreacted ethylene and propylene until the pressure in the reactor became atmospheric pressure, followed by reducing the pressure.

After the reduction of pressure was completed, copolymerization of ethylene and 1-butene was performed. That is, a mixed gas of ethylene and 1-butene (1-butene content: 12.3% by mol) was fed to the reactor so that the pressure was returned to atmospheric pressure. The temperature of the system was set to 55° C.

Then, 0.005 mmol (in terms of Zr atom) of bis(1-n-butyl-3-methylcyclopentadienyl)zirconium dichloride was added to the autoclave.

Thereafter, 400 ml of hydrogen and the mixed gas of ethylene and 1-butene were fed to effect polymerization at 60° C. for 1 hour with maintaining the total pressure at 8 kg/cm$^2$-G.

The unreacted gas was purged out of the polymerization reactor, and the resulting white powder was dried at 80° C. under reduced pressure to obtain a polymer (olefin polymer). The yield was 2,270 g.

The olefin polymer had MFR of 34 g/10 min and a bulk specific gravity of 0.41 g/ml. The results are set forth in Table 4.

Example 8

An olefin polymer was obtained in the same manner as in Example 7 except that polymerization was conducted by the following process.

Polymerization

To a 17 liter autoclave were introduced 3 kg of propylene and 45 liters of hydrogen, and the temperature was elevated to 60° C. Then, 15 mmol of triethylaluminum, 15 mmol of dicyclopentyldimethoxysilane (DCPMS) and 0.05 mmol (in terms of titanium atom) of the prepolymerized catalyst (e) obtained in Example 7 were added. The temperature of the system was elevated to 70° C. and maintained at that temperature for 40 minutes to effect homopolymerization of propylene.

After the homopolymerization of propylene was completed, the vent valve is opened to release the pressure until the pressure in the polymerization reactor became atmospheric pressure.

After the pressure was released, copolymerization of ethylene and propylene was conducted. That is, to the polymerization reactor were fed ethylene at a feed rate of 240N liter/hr and propylene at a feed rate of 960N liter/hr. The vent opening of the reactor was adjusted so that the pressure in the reactor became 10 kg/cm$^2$-G. The temperature was maintained at 70° C., and the polymerization was performed for 80 minutes.

After the copolymerization of ethylene and propylene was completed, the vent valve was opened to release the unreacted ethylene and propylene until the pressure in the reactor became atmospheric pressure, followed by reducing the pressure. After the reduction of pressure was completed, copolymerization of ethylene and 1-butene was performed. That is, a mixed gas of ethylene and 1-butene (1-butene content: 12.3% by mol) was fed to the reactor so that the pressure was returned to atmospheric pressure. The temperature of the system was set to 55° C.

Then, 0.005 mmol (in terms of Zr atom) of bis(1-n-butyl-3-methylcyclopentadienyl)zirconium dichloride was added to the autoclave.

Thereafter, 400 ml of hydrogen and the mixed gas of ethylene and 1-butene were fed to effect polymerization at 60° C. for 1 hour with maintaining the total pressure at 8 kg/cm$^2$-G.

The unreacted gas was purged out of the polymerization reactor, and the resulting white powder was dried at 80° C. under reduced pressure to obtain a polymer (olefin polymer).

Comparative Example 7

A polymer was obtained in the same manner as in Example 7 except that in the copolymerization of ethylene and 1-butene, bis(1-n-butyl-3-methylcyclopentadienyl) zirconium dichloride was not added, the amount of hydrogen fed was varied to 800 ml, and the polymerization was performed at 60° C. for 90 minutes.

The results are set forth in Table 4.

Comparative Example 8

A polymer was obtained in the same manner as in Example 8 except that in the copolymerization of ethylene and 1-butene, bis(1-n-butyl-3-methylcyclopentadienyl) zirconium dichloride was not added, the amount of hydrogen fed was varied to 800 ml, and the polymerization was performed at 60° C. for 90 minutes.

The results are set forth in Table 4.

TABLE 4

| | Yield of Polymer (g) | MFR (g/10 min) | FM (kg/cm$^2$) | IZ (kg · cm/cm) | |
|---|---|---|---|---|---|
| | | | | 23° C. | −30° C. |
| Ex. 7 | 2,270 | 34 | 9,200 | 20 | 3.3 |
| Ex. 8 | 2,185 | 33 | 8,600 | 23 | 4.0 |
| Comp. Ex. 7 | 2,114 | 32 | 8,400 | 16 | 2.9 |
| Comp. Ex. 8 | 2,090 | 31 | 7,500 | 16 | 2.8 |

What is claimed is:

1. A process for preparing an olefin polymer, comprising:
   (i) homopolymerizing propylene or copolymerizing propylene and an α-olefin other than propylene in the presence of the olefin polymerization catalyst (1) to form a crystalline polypropylene component;
   (ii) copolymerizing ethylene and an α-olefin of 3 to 20 carbon atoms to form a low-crystalline or non-crystalline ethylene/α-olefin copolymer component in the presence of the olefin polymerization catalyst (1), wherein said steps (i) and (ii) are carried out in an arbitrary order so as to form a propylene block copolymer component, said catalyst (1) comprising:
      (A) a solid titanium catalyst component containing magnesium, titanium, halogen and an electron donor,
      (B) an organometallic compound, and optionally
      (C) an electron donor;
      then adding an olefin polymerization catalyst (2) to the polymerization system, said catalyst (2) comprising:
      (D) a transition metal compound selected from Group IVB of the periodic table containing a ligand having cyclopentadienyl skeleton, and
      (E) (E-1) an aluminoxane compound, and/or (E-2) Lewis acid or an ionic compound; and
   (iii) copolymerizing ethylene and an α-olefin of 3 to 20 carbon atoms so as to form a low-crystalline or non-crystalline ethylene/α-olefin copolymer component, wherein step (iii) is carried out after steps (i) and (ii).

2. A process for preparing an olefin polymer, comprising:
   (i) homopolymerizing propylene or copolymerizing propylene and an α-olefin other than propylene in the presence of the olefin polymerization catalyst (3) to form a crystalline polypropylene component;
   (ii) copolymerizing ethylene and an α-olefin of 3 to 20 carbon atoms to form a low-crystalline or non-crystalline ethylene/α-olefin copolymer component in the presence of the olefin polymerization catalyst (3), wherein said steps (i) and (ii) are carried out in an arbitrary order so as to form a propylene block copolymer component, said catalyst (3) comprising:
      (I-1) a solid transition metal catalyst component comprising
         (A) a solid titanium catalyst component containing magnesium, titanium, halogen and an electron donor, and supported thereon,
         (D) a transition metal compound selected from Group IVB of the periodic table containing a ligand having cyclopentadienyl skeleton,
      (B) an organometallic compound, and optionally
      (C) an electron donor;
      then adding (E) (E-1) an aluminoxane compound and/ or (E-2) Lewis acid or an ionic compound to the polymerization system; and
   (iii) copolymerizing ethylene and an α-olefin of 3 to 20 carbon atoms so as to form a low-crystalline or non-crystalline ethylene/α-olefin copolymer component, wherein step (iii) is carried out after steps (i) and (ii).

3. A process for preparing an olefin polymer, comprising:
   (i) homopolymerizing propylene or copolymerizing propylene and an α-olefin other than propylene in the presence of the olefin polymerization catalyst (4) to form a crystalline polypropylene component;
   (ii) a step of copolymerizing ethylene and an α-olefin of 3 to 20 carbon atoms to form a low-crystalline or non-crystalline ethylene/α-olefin copolymer component in the presence of the olefin polymerization catalyst (4), wherein said steps (i) and (ii) are carried out in an arbitrary order so as to form a propylene block copolymer component, said catalyst (4) comprising:
      (I-2) a solid transition metal catalyst component comprising
         (D-1) a solid catalyst component comprising a transition metal compound selected from Group IVB of the periodic table containing a ligand having cyclopentadienyl skeleton, and supported thereon,
         (A-1) a titanium catalyst component containing magnesium, titanium, halogen and an electron donor,
      (B) an organometallic compound, and optionally
      (C) an electron donor;
      then adding (E) (E-1) an aluminoxane compound and/or (E-2) Lewis acid or an ionic compound to the polymerization system; and
   (iii) copolymerizing ethylene and an α-olefin of 3 to 20 carbon atoms so as to form a low-crystalline or non-crystalline ethylene/α-olefin copolymer component, wherein step (iii) is carried out after steps (i) and (ii).

4. A process for preparing an olefin polymer, comprising:
(i) homopolymerizing propylene or copolymerizing propylene and an α-olefin other than propylene in the presence of the olefin polymerization catalyst (5) to form a crystalline polypropylene component;
(ii) copolymerizing ethylene and an α-olefin of 3 to 20 carbon atoms to form a low-crystalline or non-crystalline ethylene/α-olefin copolymer component in the presence of the olefin polymerization catalyst (5),
wherein said steps (i) and (ii) are carried out in an arbitrary order so as to form a propylene block copolymer component, said catalyst (5) comprising:
(I-3) a solid transition metal catalyst component comprising
(A) a solid titanium catalyst component containing magnesium, titanium, halogen and an electron donor, and supported thereon,
(E) (E-1) an aluminoxane compound and/or (E-2) Lewis acid or an ionic compound,
(B) an organometallic compound, and optionally
(C) an electron donor;
then adding (D) a transition metal compound selected from Group IVB of the periodic table containing a ligand having cyclopentadienyl skeleton to the polymerization system; and
(iii) copolymerizing ethylene and an α-olefin of 3 to 20 carbon atoms so as to form a low-crystalline or non-crystalline ethylene/α-olefin copolymer component, wherein step (iii) is carried out after steps (i) and (ii).

* * * * *